United States Patent
Murphey et al.

(10) Patent No.: US 12,024,315 B2
(45) Date of Patent: Jul. 2, 2024

(54) BOOM DEPLOYER

(71) Applicant: Opterus Research and Development, Inc., Fort Collins, CO (US)

(72) Inventors: Thomas W. Murphey, Fort Collins, CO (US); Levi Nicholson, Fort Collins, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 327 days.

(21) Appl. No.: 17/650,132

(22) Filed: Feb. 7, 2022

(65) Prior Publication Data

US 2022/0267029 A1      Aug. 25, 2022

Related U.S. Application Data

(60) Provisional application No. 63/152,502, filed on Feb. 23, 2021.

(51) Int. Cl.
*B64G 1/22* (2006.01)
*E04C 3/00* (2006.01)

(52) U.S. Cl.
CPC .............. *B64G 1/222* (2013.01); *E04C 3/005* (2013.01)

(58) Field of Classification Search
CPC ........... E04C 3/005; B64G 1/222; B64G 1/44; B21C 47/003; B21C 47/28; B29C 53/20; B65H 75/34; B65H 2701/332; B65H 75/4402; B65H 75/4471; H01Q 1/087; H02S 30/20; H02S 30/10
See application file for complete search history.

(56) References Cited

U.S. PATENT DOCUMENTS

| | | | | |
|---|---|---|---|---|
| 3,434,674 | A * | 3/1969 | Groskopfs | H01Q 1/087 242/390.2 |
| 3,589,632 | A * | 6/1971 | Rew | F16H 19/064 436/805 |
| 3,608,844 | A | 9/1971 | Tumulty, Jr. et al. | |
| 8,683,755 | B1 * | 4/2014 | Spence | B64G 1/222 52/173.3 |
| 9,611,056 | B1 * | 4/2017 | Spence | B64G 1/222 |
| 2012/0160042 | A1 * | 6/2012 | Stanev | F16H 19/064 74/89.21 |
| 2014/0151485 | A1 * | 6/2014 | Baudasse | B65H 75/34 242/375 |

(Continued)

OTHER PUBLICATIONS

ISA/US International Search Report and Written Opinion for corresponding International Application No. PCT/US2022/015591 mailed Apr. 27, 2022 (9 pgs).

*Primary Examiner* — Theodore V Adamos
(74) *Attorney, Agent, or Firm* — Harris Beach PLLC

(57) ABSTRACT

A boom deployer to deploy or retract a deformable boom includes a boom deployer frame. An integrated motor-spool assembly is translatably mounted in the boom deployer frame. At least one belt tensioning assembly is also translatably mounted in the boom deployer frame. The belt tensioning assembly tensions at least one recirculating belt which rolls over a roller of the belt tensioning assembly. The at least one recirculating belt is configured to roll over a rolled deformable boom, the deformable boom clamped to and rolled on the integrated motor-spool assembly. A boom deployer with a tensioned stationary belt is also described.

18 Claims, 35 Drawing Sheets

(56) References Cited

U.S. PATENT DOCUMENTS

| | | | |
|---|---|---|---|
| 2015/0259911 A1* | 9/2015 | Freebury | E04H 12/18 52/108 |
| 2016/0311558 A1* | 10/2016 | Turse | B64G 1/222 |
| 2017/0298628 A1* | 10/2017 | Rakow | E04C 3/005 |
| 2018/0244405 A1* | 8/2018 | Brown | B65H 75/4402 |
| 2018/0309008 A1* | 10/2018 | Gibb | H01L 31/041 |

* cited by examiner

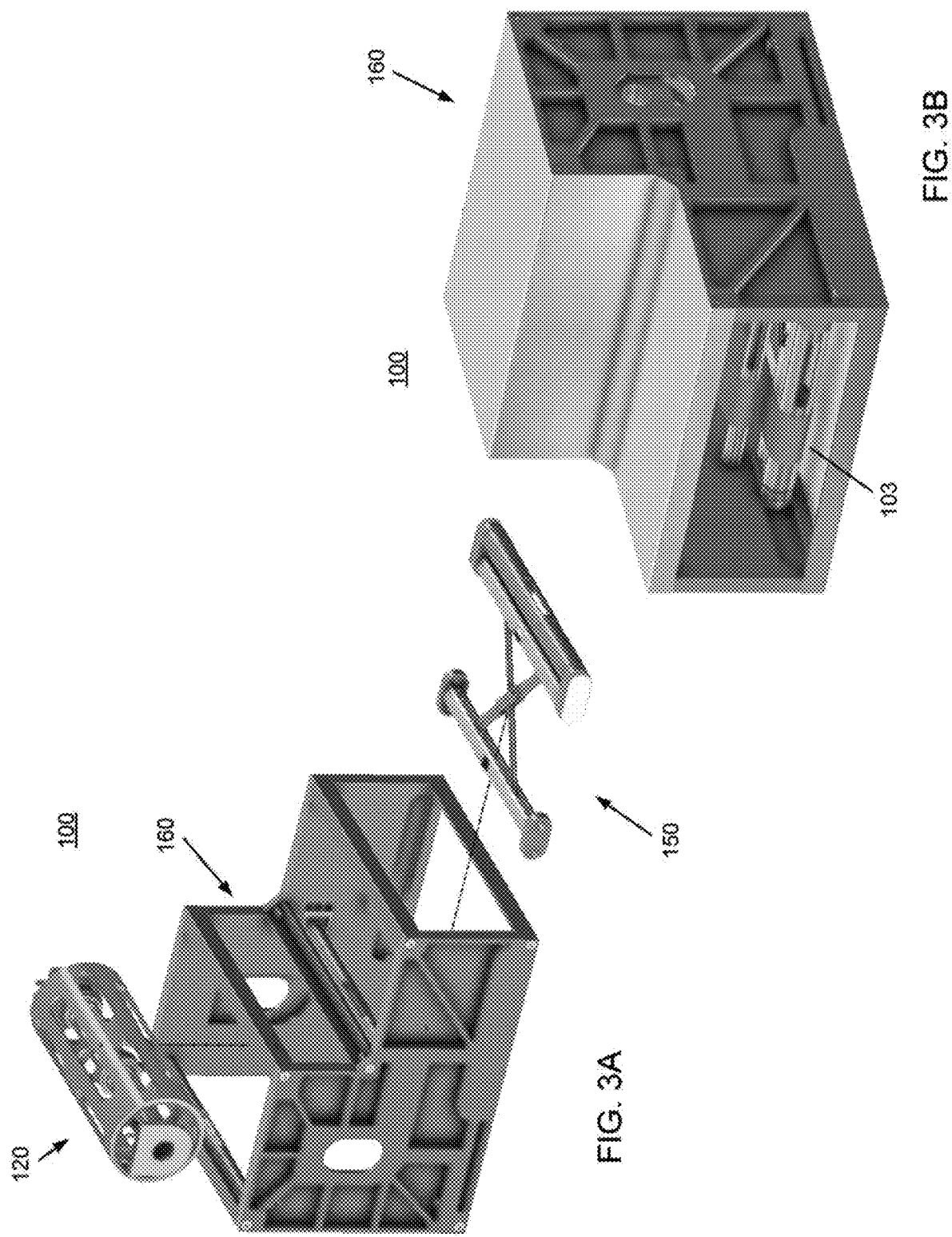

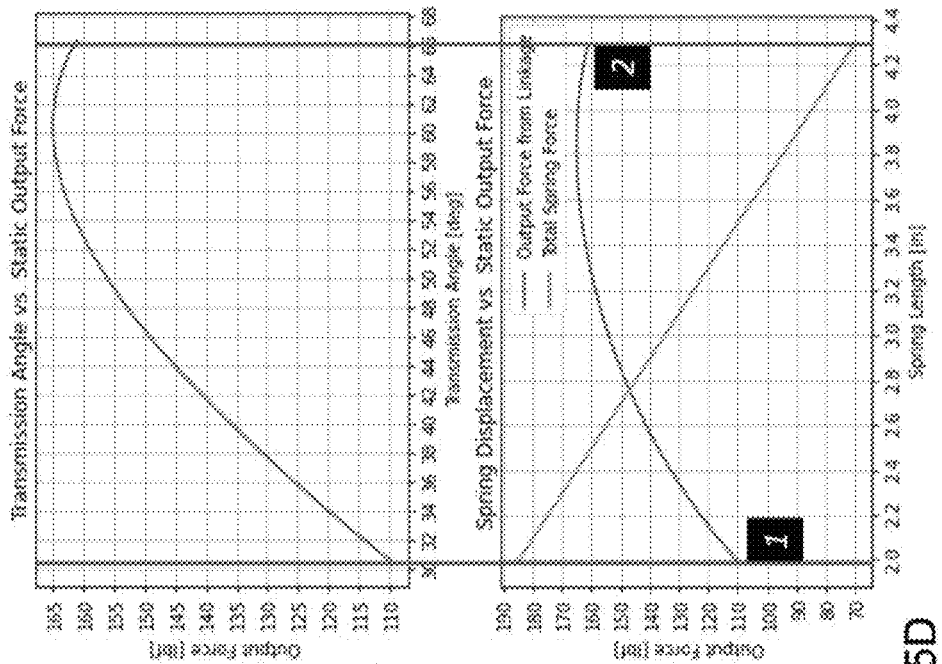
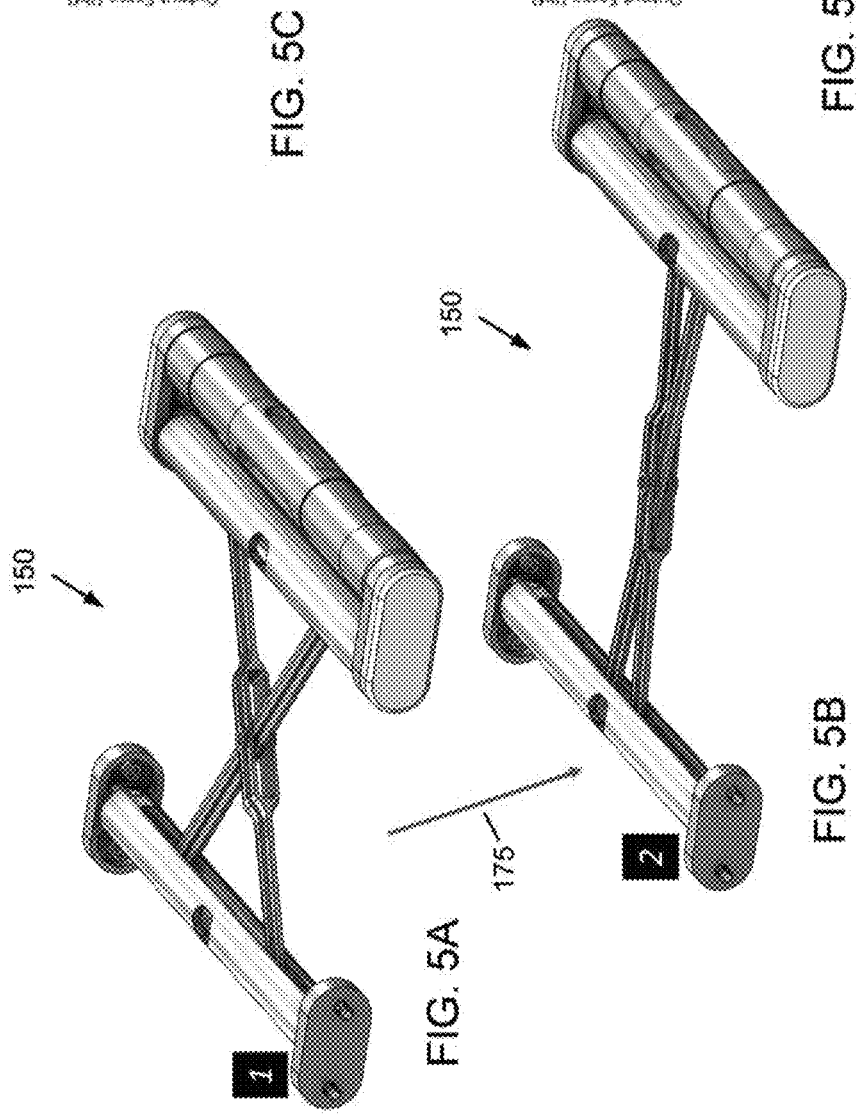
FIG. 5A
FIG. 5B
FIG. 5C
FIG. 5D

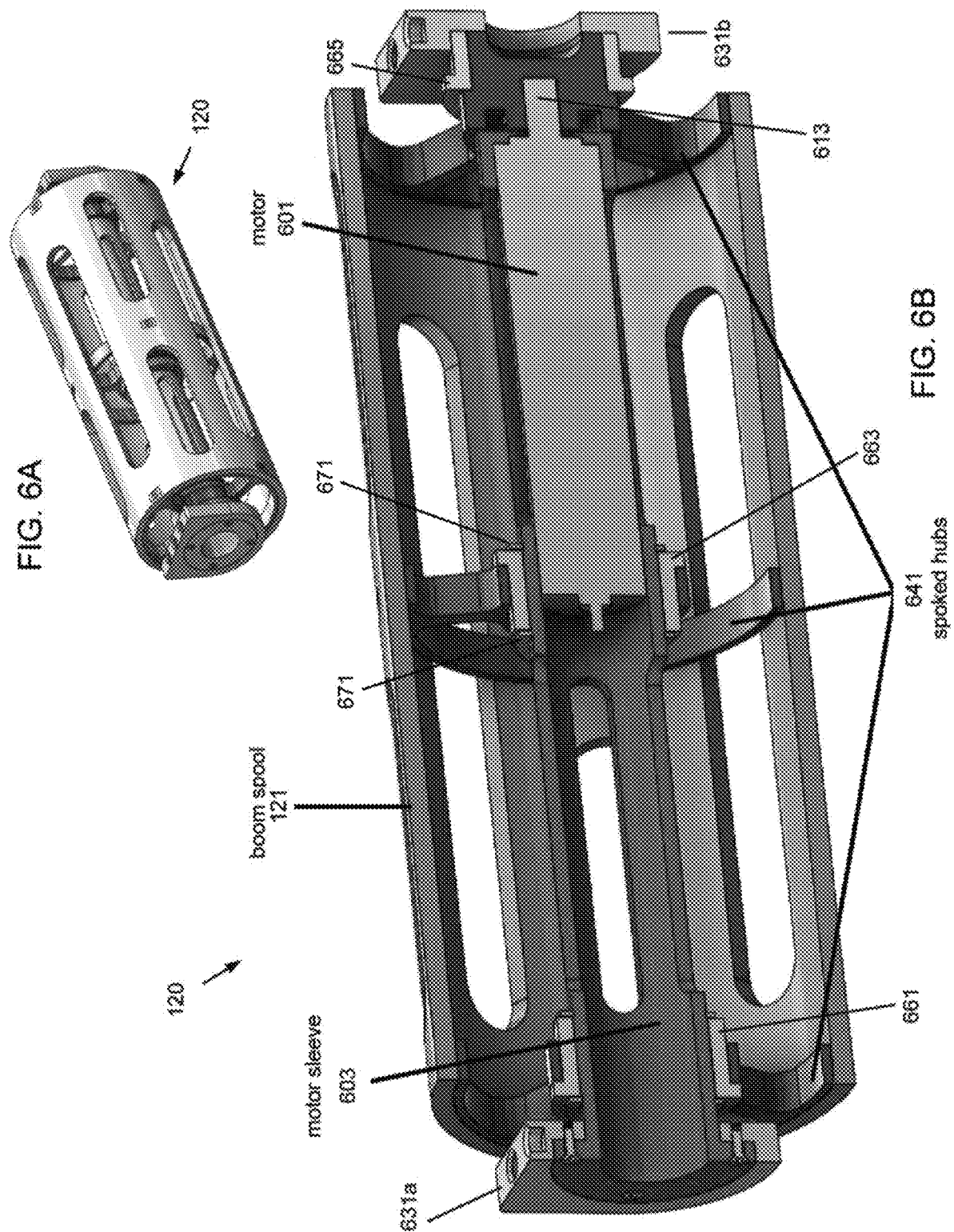

BOOM DEPLOYER

CROSS-REFERENCE TO RELATED APPLICATIONS

This application claims priority to and the benefit of U.S. provisional patent application Ser. No. 63/152,502, BOOM DEPLOYER, filed Feb. 23, 2021, which application is incorporated herein by reference in its entirety.

FIELD OF THE APPLICATION

The application relates to a deployer particularly a deployer for a rolled deformable boom.

BACKGROUND

Deformable booms can be flattened and rolled for stowage.

SUMMARY

A boom deployer to deploy or retract a deformable boom includes a boom deployer frame. An integrated motor-spool assembly is translatably mounted in the boom deployer frame. At least one belt tensioning assembly with one end rigidly fixed and the other is translatably mounted in the boom deployer frame. The belt tensioning assembly tensions at least one recirculating belt which rolls over a roller of the belt tensioning assembly. The at least one recirculating belt is configured to roll over a rolled deformable boom. The deformable boom is clamped to and rolled on the integrated motor-spool assembly.

The boom deployer can further include an additional translating roller assembly which translates in a direction about perpendicular to the integrated motor-spool assembly.

The belt tensioning assembly can include a scissor linkage. The scissor linkage can include a plurality of springs and linkage lengths to provide a force-travel profile.

The boom deployer can also include two or more recirculating belts. The two or more recirculating belts can be disposed on rollers about adjacent to load bearing longerons of the rolled deformable boom.

A motor of the integrated motor-spool assembly can be rotationally fixed relative to the deployer frame and translates vertically within the boom deployer frame.

The integrated motor-spool assembly can include a stationary motor disposed within. The integrated motor-spool assembly can rotate on a plurality of bearings about the stationary motor disposed within. The bearings can include a needle bearing or a ball bearing. The bearings can include a plain bearing or a sleeve bearing. The bearings can include a journal bearing.

The recirculating belt can cause a substantially constant radial compression force on the rolled deformable boom to resist boom blooming.

The boom deployer can further include a boom securement clamp configured to secure a boom to the integrated motor-spool assembly.

The boom deployer can further include a root end guide configured to react to bending along a centerline plane perpendicular to a flange plane.

The boom deployer can further include a root end guide configured to react to bending along a centerline plane parallel to a deployer side-plate.

The boom deployer can further include a distal end interface mechanically coupled to a free end of the boom. The distal end interface can include at least one slider to react to a loading at load bearing longerons or load bearing elements of the boom to provide a load path from the longerons to a backplate of said distal end interface.

A boom deployer to deploy or retract a deformable boom includes a boom deployer frame. An integrated motor-spool assembly is translatably mounted in the boom deployer frame. At least one belt tensioning assembly has one end rigidly fixed and the other translatably mounted in the boom deployer frame, the belt tensioning assembly tensions at least one stationary belt anchored at a first end and tensioned at a second anchor, wherein the stationary belt provides a sliding consolidation surface configured to put pressure on the boom to hold it rolled and where the boom slides over the stationary belt, the deformable boom clamped to and rolled on the integrated motor-spool assembly.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 3A is a drawing showing an exploded view of the frame, belt tensioning assembly, and integrated motor-spool assembly of the boom deployer of FIG. 1;

FIG. 3B is a drawing showing an isometric view of the boom deployer of FIG. 1;

FIG. 5A is a drawing showing an elevated view of a belt tensioning assembly in a nearly retracted position imparting a minimal force on the recirculating belt;

FIG. 5B is a drawing showing an elevated view of a belt tensioning assembly in a nearly fully extended position imparting a maximal force on the recirculating belt;

FIG. 5C is a graph showing transmission angle vs. static output force;

FIG. 5D is a graph showing spring displacement vs. static output force;

FIG. 6A is a drawing showing an isometric view of an exemplary integrated motor-spool assembly;

FIG. 6B is a drawing showing a cutaway view of the integrated motor-spool assembly of FIG. 6A;

DETAILED DESCRIPTION

Definitions

Figure 1:
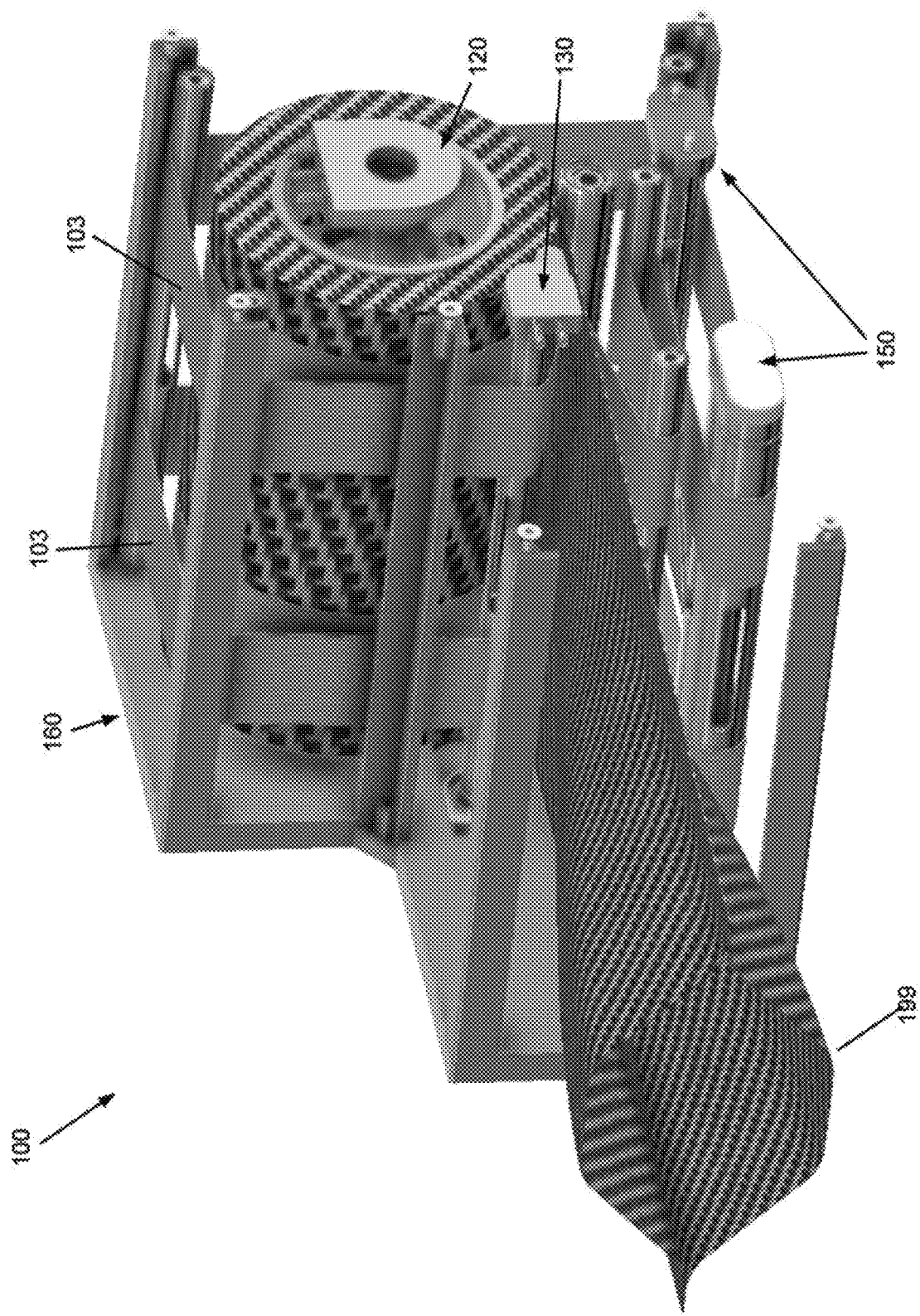
FIG. 1 is a drawing showing a perspective view of an exemplary boom deployer according to the Application.

Vertical and horizontal— The terms vertical and horizontal are used for convenience to convey about orthogonal directions of translation. Otherwise, there is no fixed sense of up and down or vertical and horizontal, other than for describing the orientation of the exemplary deployer in the drawings. A boom deployer according to the Application is functional and usable in any orientation.

Mechanically coupled refers to either a direct mechanical connection or an indirect coupling through any suitable intervening structure, including, for example, a washer, spacer, or other intermediate material or structure.

FIG. 1 is a drawing showing a perspective view of an exemplary boom deployer 100 according to the Application. Boom deployer 100 deploys a rollable deformable boom 199. The rolled deformable boom 199 is roll stored on an integrated motor-spool assembly 120. The integrated motor-spool assembly 120 and other assemblies of the boom deployer 100 are attached to and housed within boom deployer frame assembly 160. The rotation of the spool as driven by motor assembly 180 is controlled by the recirculating belt 103 and the belt tensioning assembly 150. In the exemplary deployer of FIG. 1, the rotation of the spool is directly coupled to the rotation of the motor shaft. The recirculating belt is controlled by the rotation of the spool. The friction force of the belt on the spool, caused by the force applied to the belt by the tensioning mechanism, is what causes the belt to recirculate.

Belt tensioning assembly 150 causes a tensioning force as exerted by the recirculating belt 103 on rolled deformable boom 199. The force exerted by the scissor linkage on the recirculating belt 103 permits the recirculating belt to compress the boom around the boom spool, thereby resisting blooming during boom retraction and boom extension operations.

A boom deployer according to the Application can be used to stow, retract, or extend any suitable deformable/rollable boom that can be rolled about flat. Booms can be of any suitable closed or open cross section boom type. The tensioned recirculating belt resists blooming, i.e., an undesired propensity of rollable booms to unwrap themselves, somewhat analogous to the way an unconstrained watch spring might unwind. The belt tensioning assembly maintains an about constant compressive force during retraction and deployment. The belt tensioning assembly also takes up the slack in the recirculating belt caused by a decreasing spooled boom diameter caused by boom deployment. The central hub includes a stationary motor which drives the spool. The taught recirculating belt around the rolled boom resists blooming of the rolled deformable boom.

Figure 2:
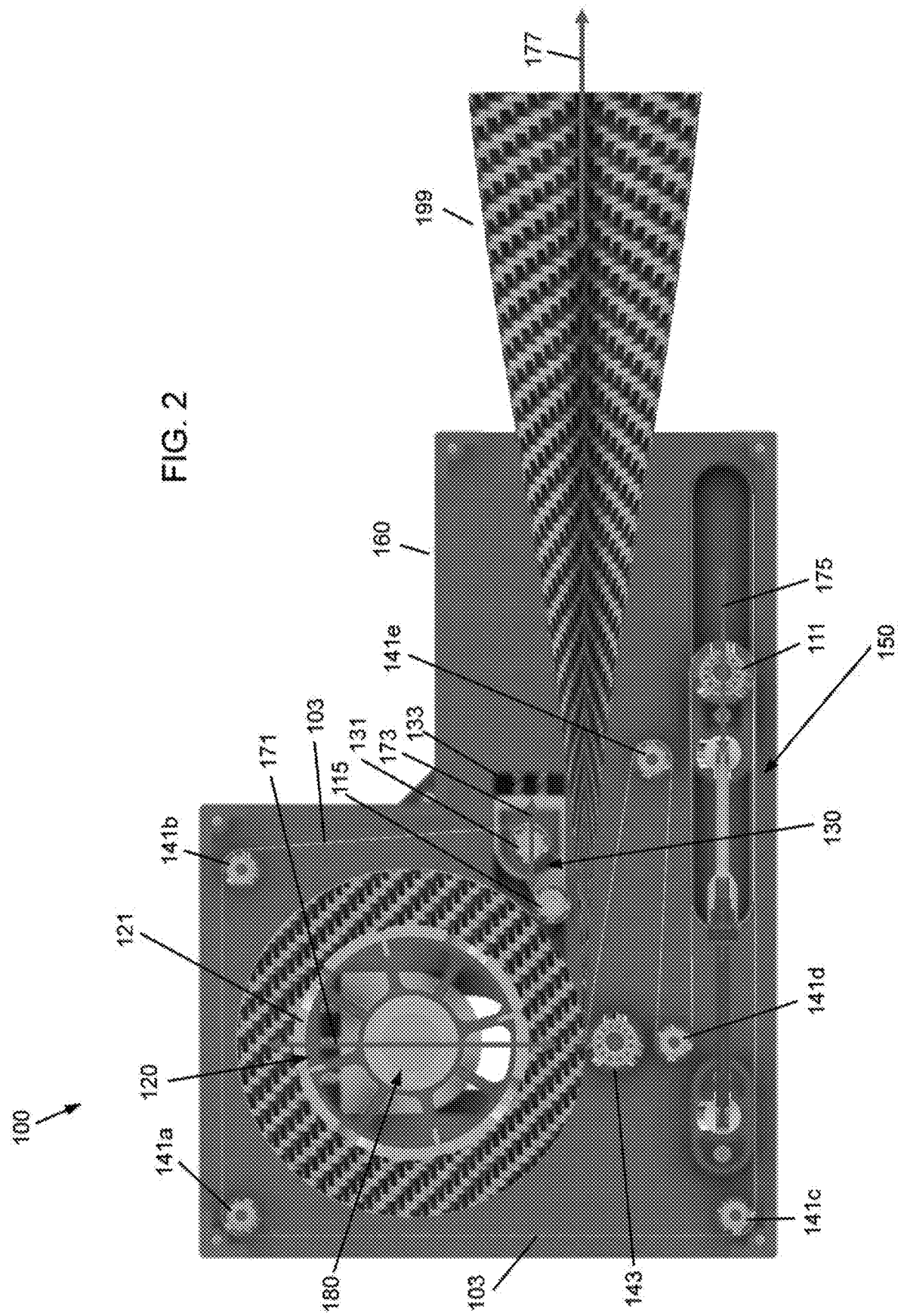
FIG. 2 is a drawing showing a side cut away drawing of the boom deployer of FIG. 1.

FIG. 2 is a drawing showing a side cut away drawing of the boom deployer 100 of FIG. 1. Anti-blooming recirculating belt 103 recirculates around fixed and translating rollers. As illustrated by the belt tensioning linkage translation direction arrow 175, the belt tensioning assembly 150 maintains a semi-consistent belt tension throughout a boom extension or boom retraction operation. As illustrated by the boom spool vertical translation direction arrow 171, the integrated motor-spool assembly 120 translates vertically to maintain a consolidation force against roller 143, and maintain a constant plane of deployment. That is, the vertically translating motor-spool assembly also allows the boom to deploy along a single plane that does not translate/change throughout deployment/retraction. As illustrated by the horizontal roller travel translation direction arrow 173, the horizontally translating roller assembly 130 provides a maximum recirculating belt 103 contact against the boom 199 during a boom extension or boom retraction operation as assisted by springs 133.

A boom deployer according to the Application can also include a morphing root end guide that resists bending perpendicular to the flange plane.

A boom deployer according to the Application can also include a morphing distal end interface that reacts axial loading of the longerons within the boom and allows interfacing with operational loads.

Table of FIG. 1, FIG. 2 Selected Reference Designators

- 100 boom deployer
- 103 recirculating belt
- 111 belt tensioning translating idler roller
- 120 integrated motor-spool assembly
- 121 boom spool
- 130 horizontally translating roller assembly
- 131 horizontally translating idler roller
- 133 spring
- 141*a* fixed idler roller
- 141*b* fixed idler roller
- 141*c* fixed idler roller
- 141*d* fixed idler roller
- 141*e* fixed idler roller
- 143 roller against which boom spool operates
- 150 belt tensioning assembly
- 160 boom deployer frame assembly
- 171 boom spool translates vertically, translation direction arrow
- 173 horizontal roller travel, translation direction arrow
- 175 belt tensioning linkage, translation direction arrow
- 177 boom deployment direction arrow
- 180 motor assembly
- 199 deformable boom FIG. 3A is a drawing showing an exploded view of the frame, belt tensioning assembly, and integrated motor-spool assembly of the boom deployer 100 of FIG. 1.

Example—FIG. 3B is a drawing showing an isometric view of the boom deployer 100 of FIG. 1. The dimensions of the exemplary boom deployer are 15.1" W×17.56" L×12.29" H; envelope Volume=3258.8 cu. in.=0.0534 m³. There are 5 fixed idler rollers (OD=0.75"), 1 fixed boom consolidation roller (OD=1"), 3 translating idler rollers (OD=1" & 1.3"), a boom spool with OD=5" (translates vertically) and with an estimated assembly mass is ~25 lbm (without a spooled boom).

Figure 4A:
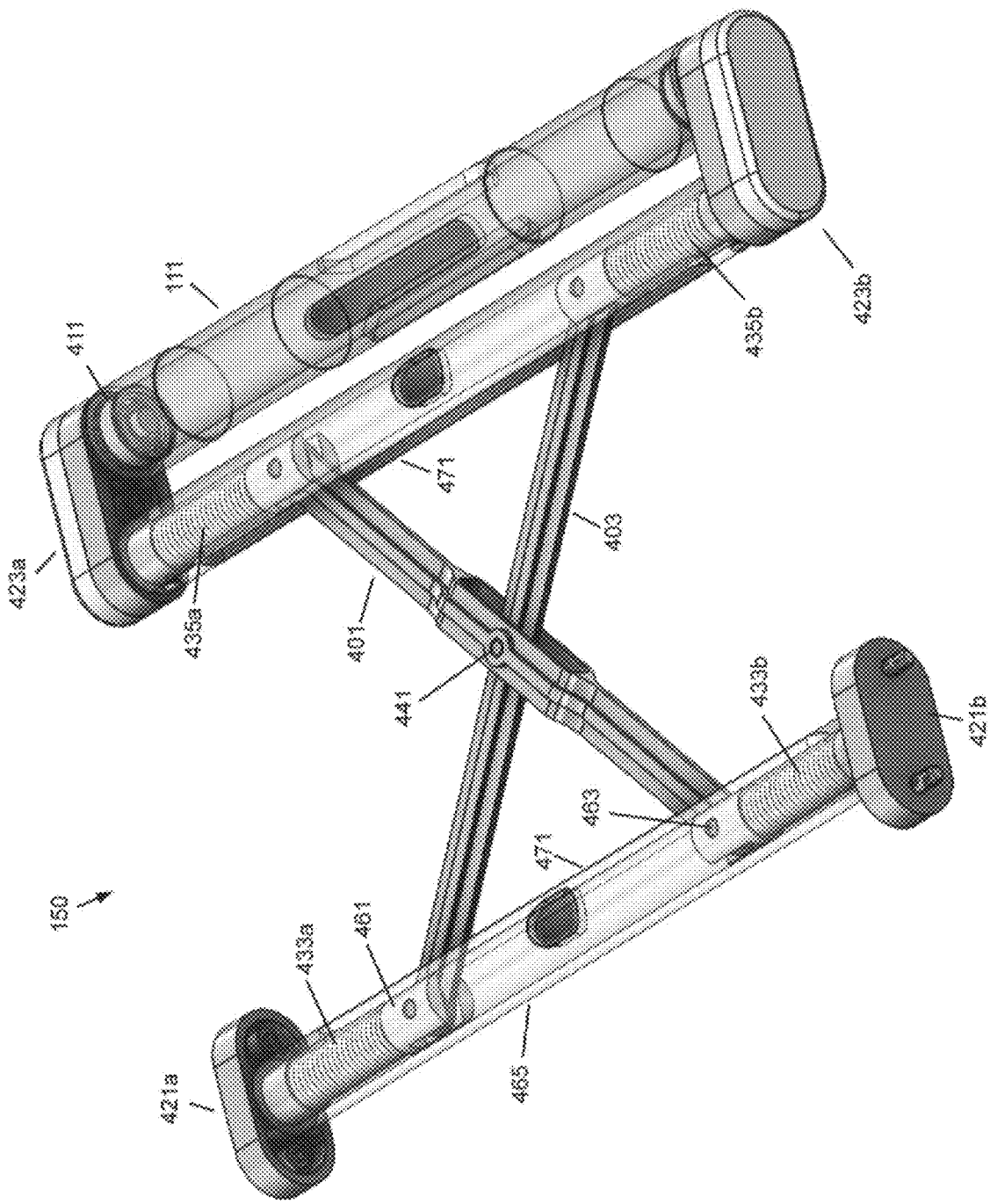
FIG. 4A is a drawing showing an elevated view of an exemplary belt tensioning assembly.

FIG. 4A is a drawing showing an elevated view of an exemplary belt tensioning assembly 150. The linkage mechanism includes bridge link 401 and link 403 pinned by pin 441 which allows linear springs 433*a* to 435*b* to impart a non-linear force on the recirculating belt 103 via roller 111 throughout a boom extension or boom retraction operation. In the example, roller 111 rotates by bearings 411. While ball bearings were used in the example, any suitable roller bearings can be used, such as, for example, journals, balls, needles, etc. The spring force of the belt tensioning assembly 150 is coincident with linkage pins 463 of linkage slides 461. An important feature of the linkage, such as the exemplary scissor linkage of FIG. 1, is that generally a linear decline in compression spring output force is counteracted by the increasing mechanical advantage provided by the extending scissor linkage.

The belt tensioning assembly 150 translates roller 111 according to the belt tensioning linkage translation direction arrow 175. The linkage slides 461 move linearly within a cylinder 465, the linkage scissor arms (X arms) moving through cylinder slots 471. Sliding end caps 423*a* to 423*b* slide within corresponding channels in the boom deployer frame assembly 160, or within channels affixed to the boom deployer frame assembly 160 (not shown in FIG. 4A). Sliding end caps 423*a* to 423*b* can slide in any suitable types of grooves either in the frame 160 or attached to the frame 160. Any suitable grooves can be used. The X arms move roller 111 with respect to end caps 421*a*, 421*b* which end caps 421*a*, 421*b* are mechanically affixed (anchored) to the frame. In the example, end caps 421*a*, 421*b* are mechanically coupled by machine screws, however any suitable fasteners or anchors can be used. The bridge link 401 and link 403 running therethrough are merely exemplary. Any suitable pivoting X arm structure can be used.

Figure 4B:
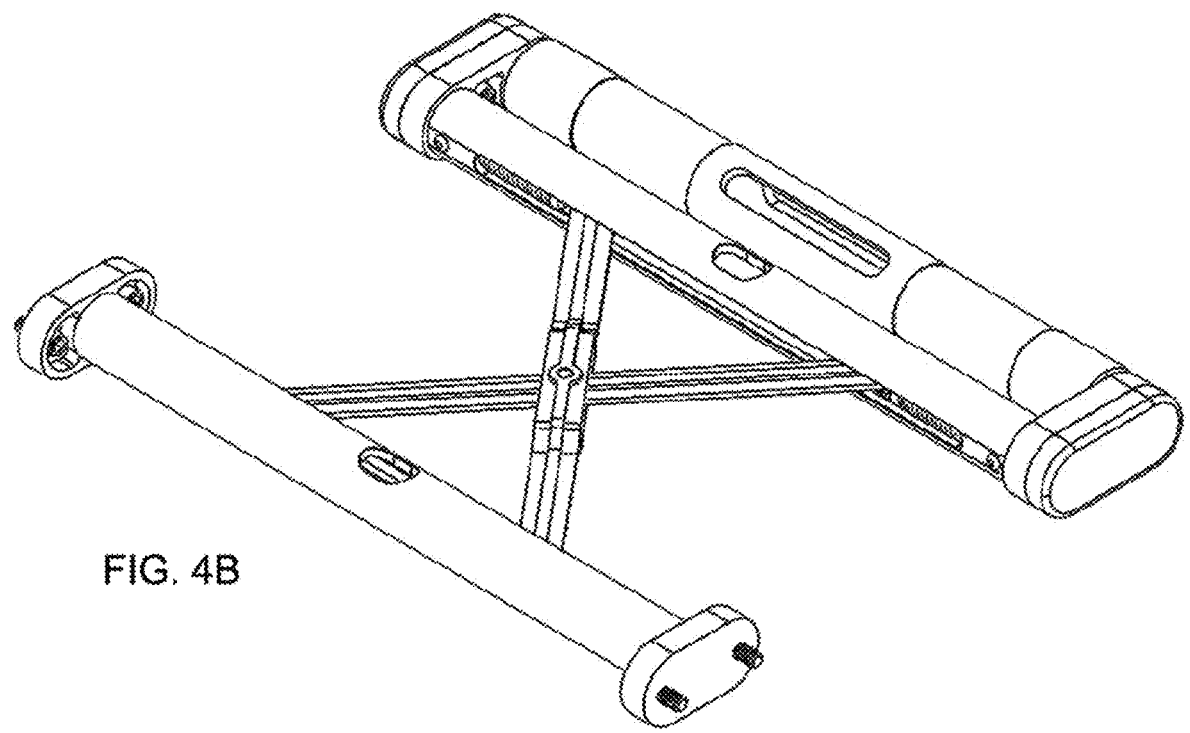
FIG. 4B is a drawing showing an isometric view of the exemplary belt tensioning assembly of FIG. 4A.
Figure 4C:
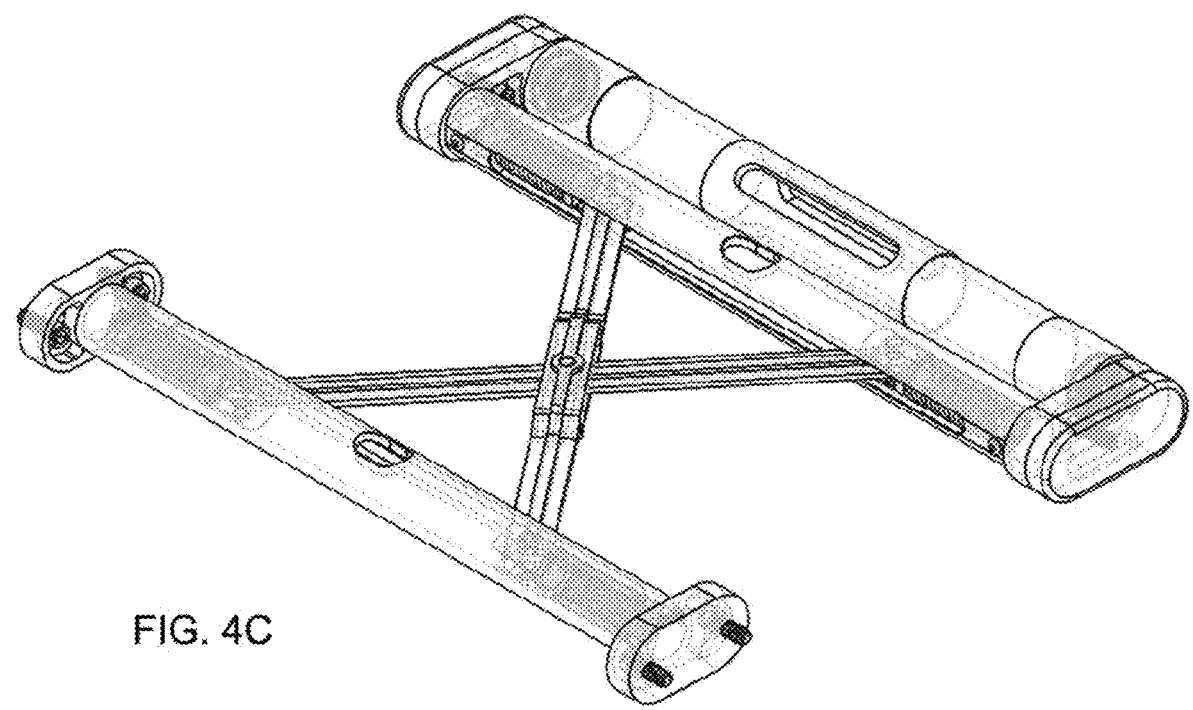
FIG. 4C is a drawing showing an isometric view of the exemplary belt tensioning assembly of FIG. 4A showing internal detail.
Figure 4D:
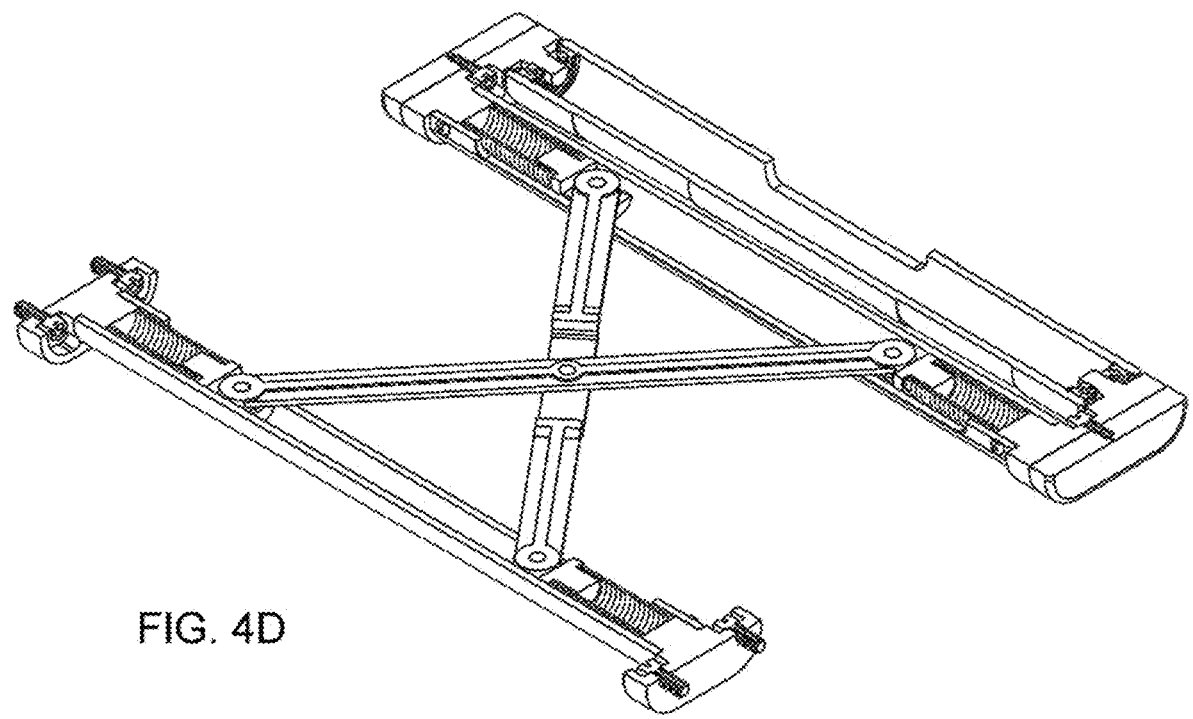
FIG. 4D is a drawing showing a cut away isometric view of the exemplary belt tensioning assembly of FIG. 4A showing internal detail.
Figure 4E:
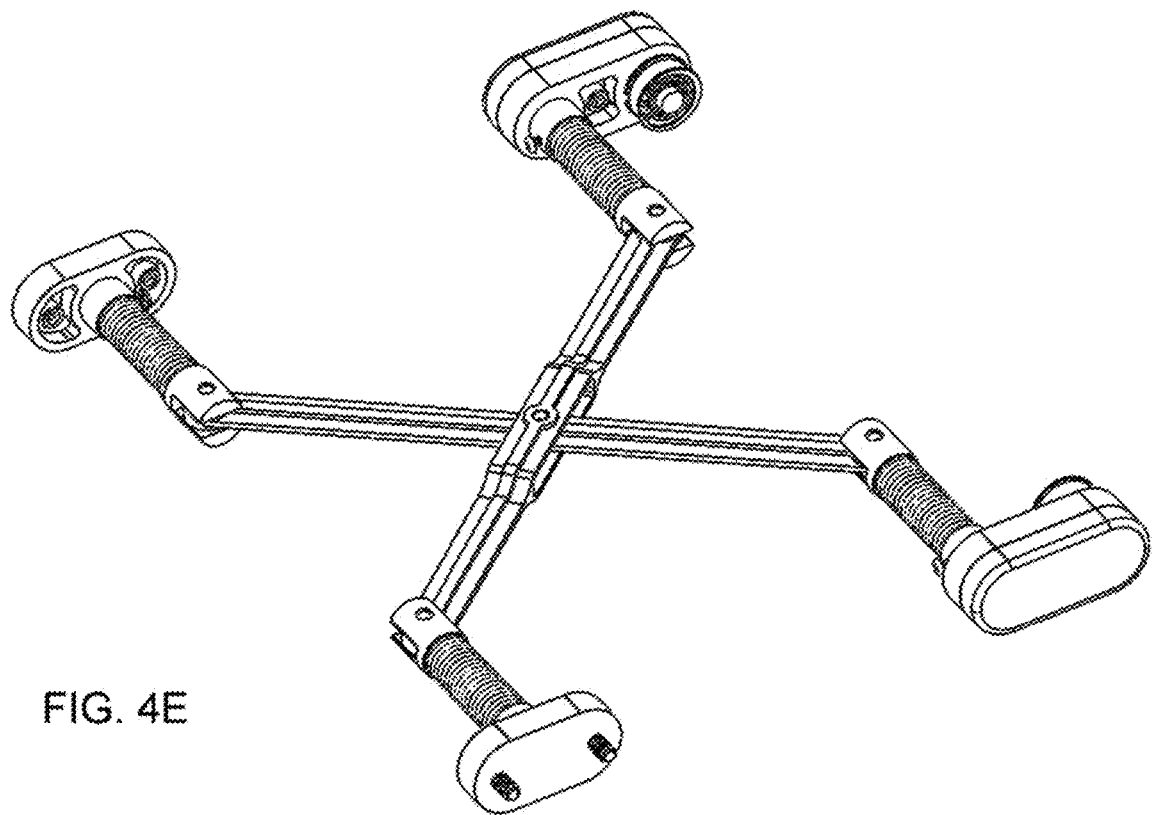
FIG. 4E is a drawing showing a isometric view of internal components of the exemplary belt tensioning assembly of FIG. 4A.
Figure 4F:
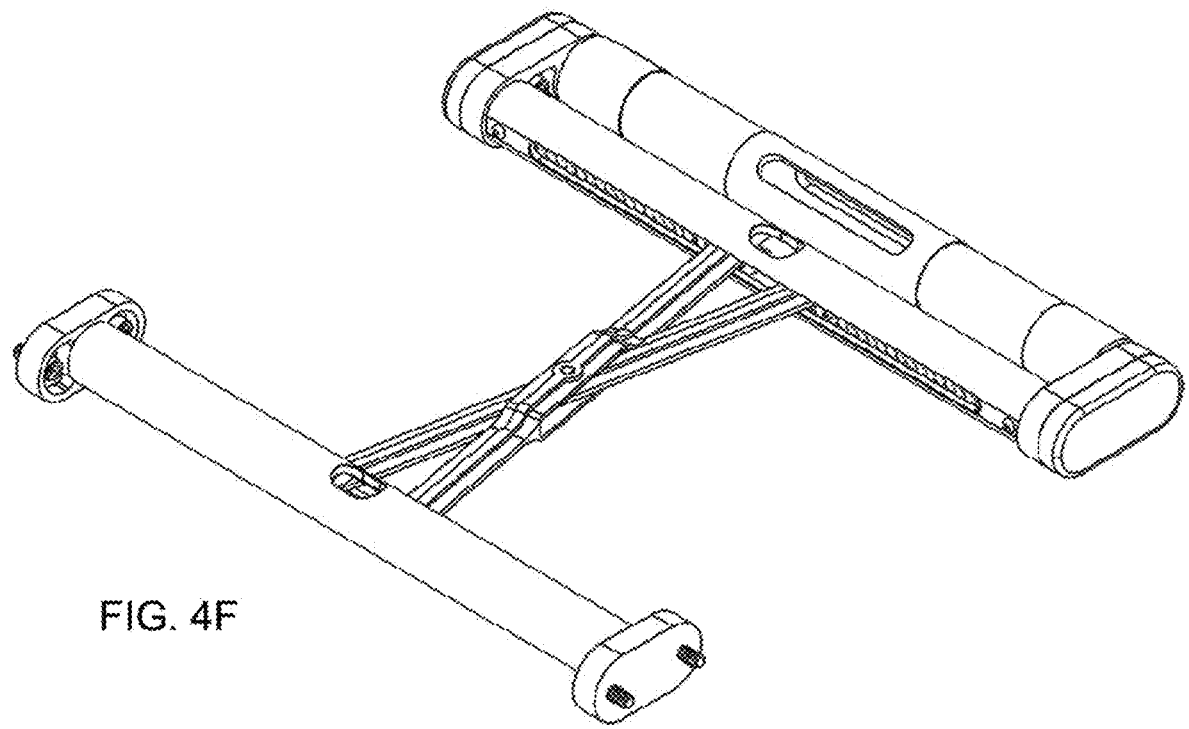
FIG. 4F is a drawing showing an isometric view of the exemplary belt tensioning assembly of FIG. 4A where the X arms are extended.
Figure 4G:
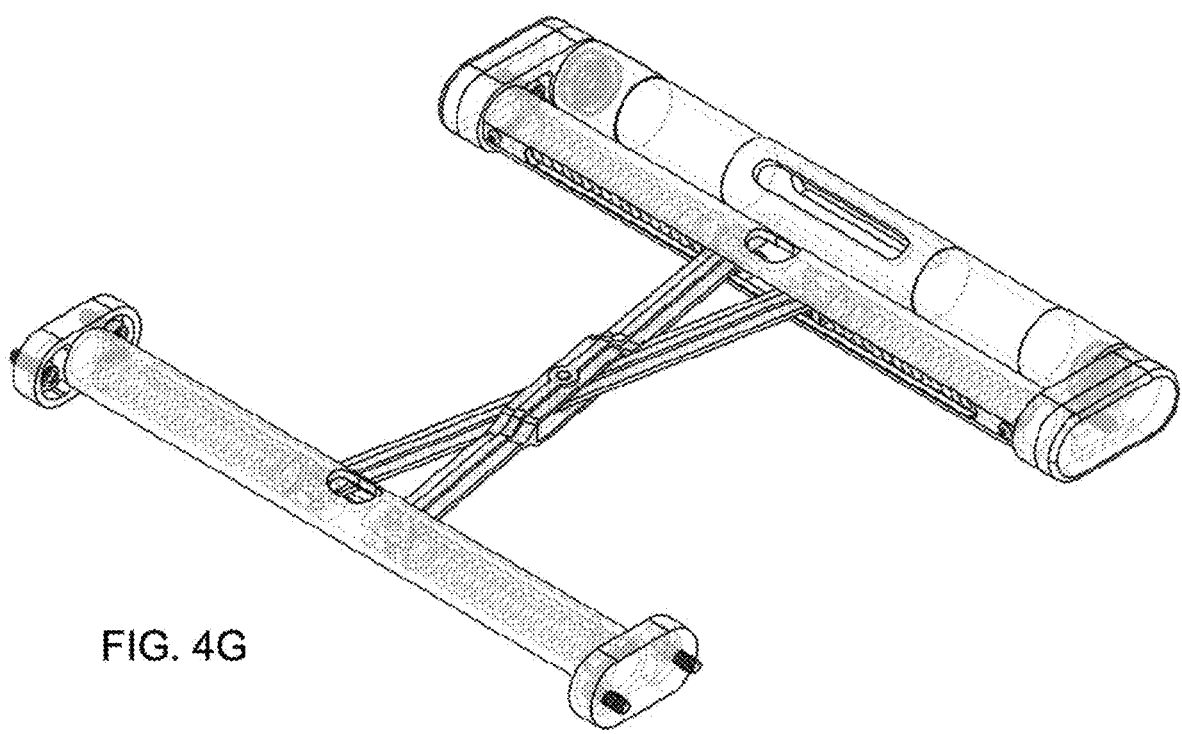
FIG. 4G is a drawing showing an isometric view of the exemplary belt tensioning assembly of FIG. 4A showing internal detail where the X arms are extended.
Figure 4H:
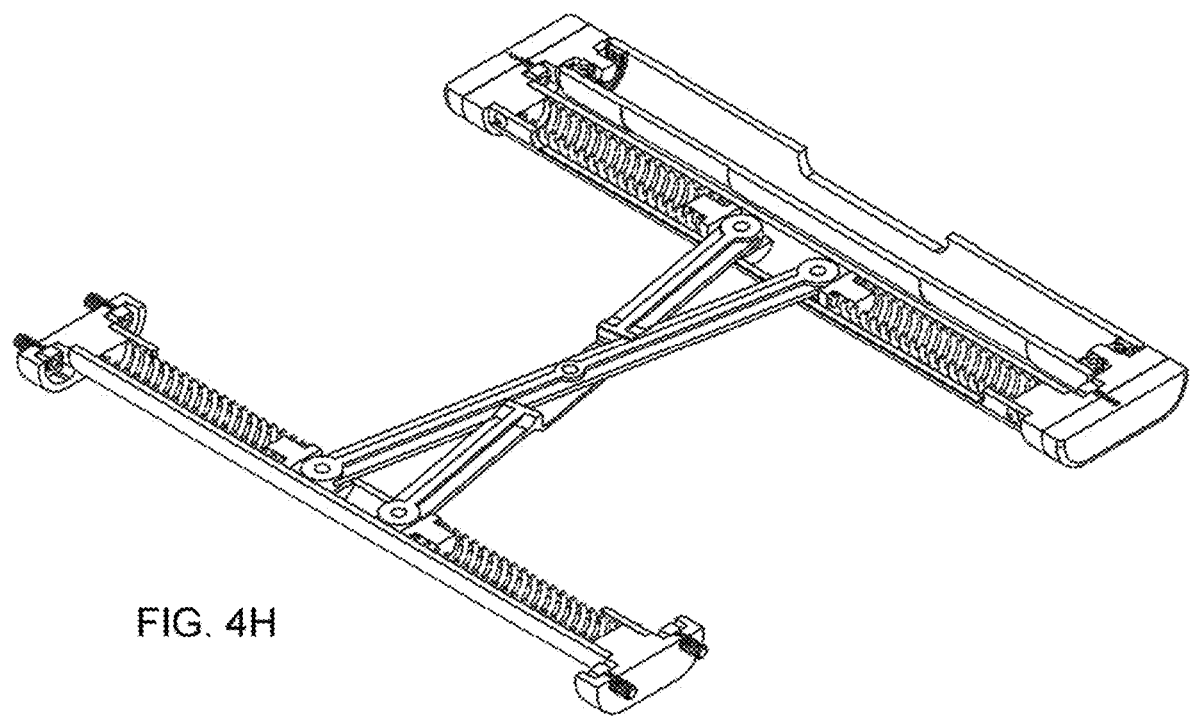
FIG. 4H is a drawing showing a cut away isometric view of the exemplary belt tensioning assembly of FIG. 4A showing internal detail where the X arms are extended.
Figure 4I:
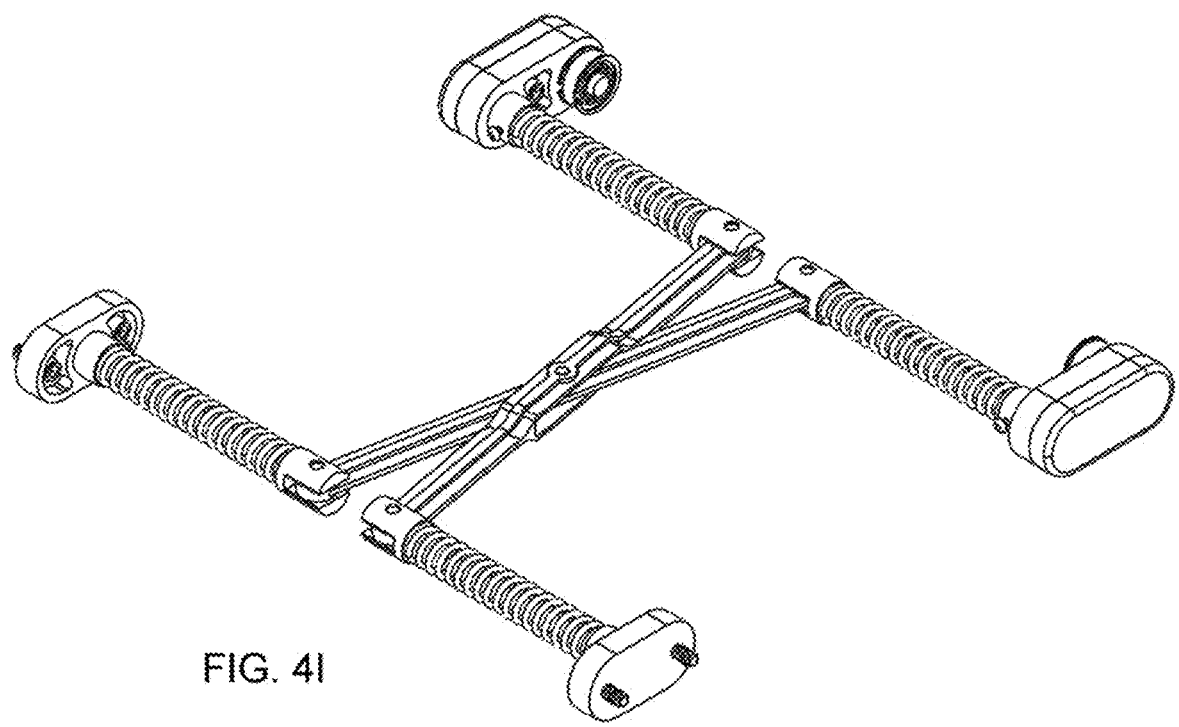
FIG. 4I is a drawing showing a isometric view of internal components of the exemplary belt tensioning assembly of FIG. 4A where the X arms are extended.
Figure 4J:
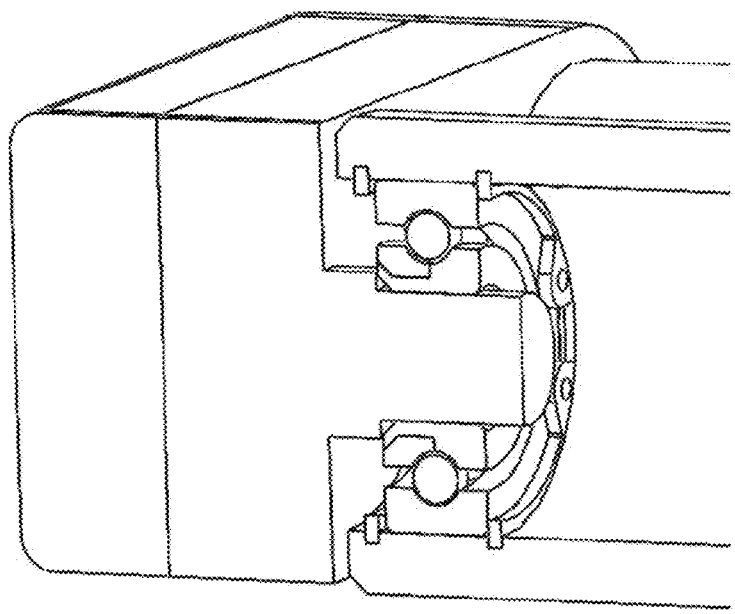
FIG. 4J is a drawing showing a cut away view of one end of a belt tensioning translating idler roller of the exemplary belt tensioning assembly of FIG. 4A.
Figure 4K:
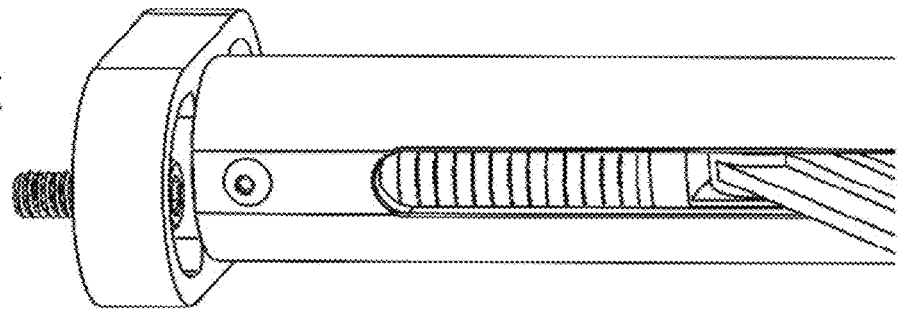
FIG. 4K is a drawing showing a view of a cylinder of the exemplary belt tensioning assembly of FIG. 4A.
Figure 4L:
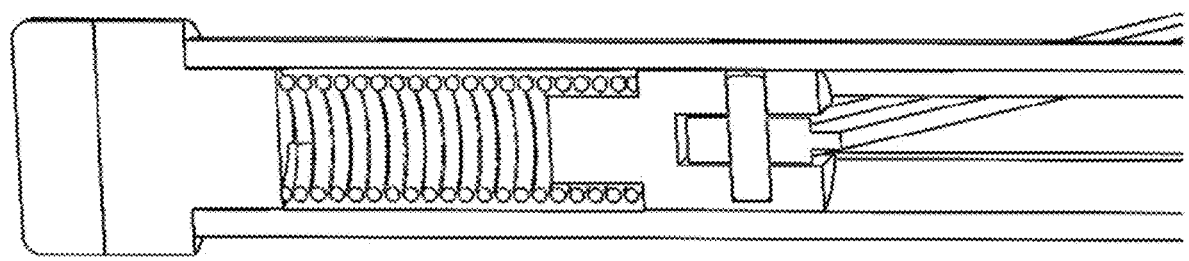
FIG. 4L is a drawing showing a cut away view of a cylinder of the exemplary belt tensioning assembly of FIG. 4K.
Figure 4M:
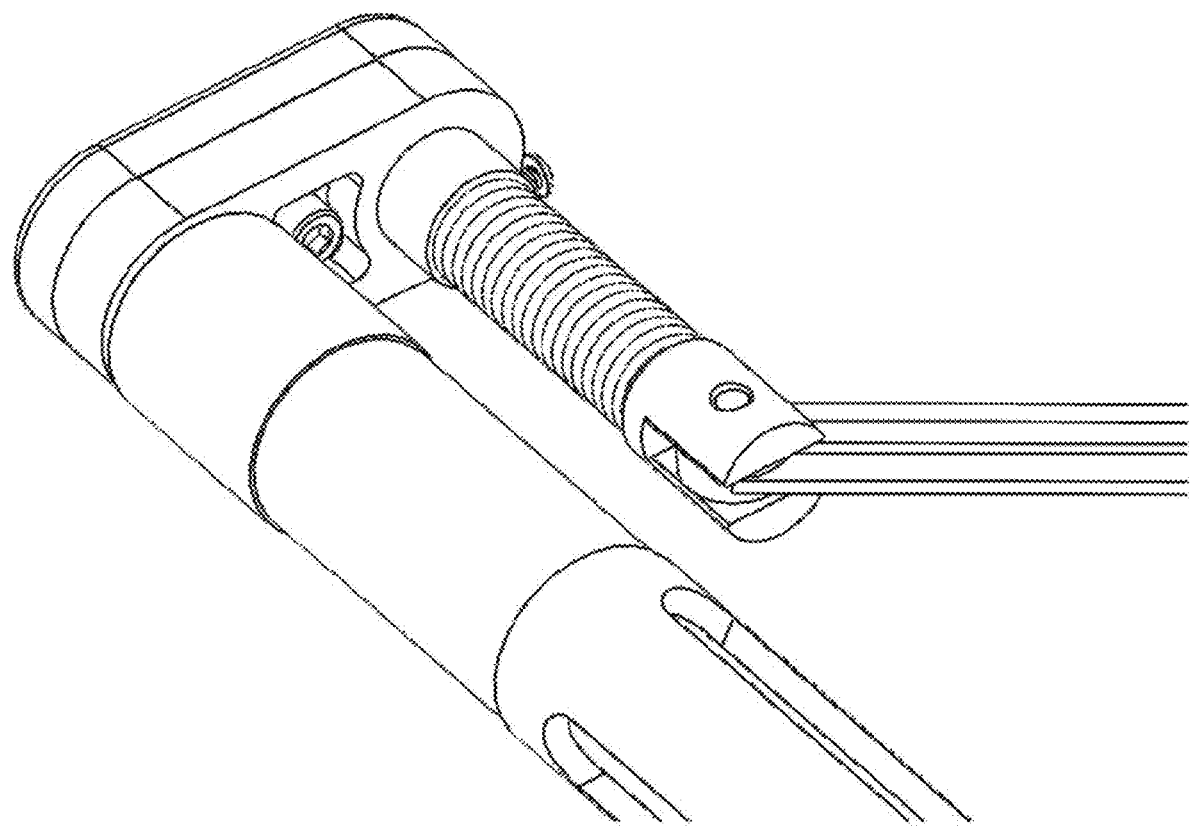
FIG. 4M is another drawing showing one end of a belt tensioning translating idler roller the exemplary belt tensioning assembly of FIG. 4A in more detail.

FIG. 4B is a drawing showing an isometric view of the exemplary belt tensioning assembly of FIG. 4A. FIG. 4C is a drawing showing an isometric view of the exemplary belt tensioning assembly of FIG. 4A showing internal detail. FIG. 4D is a drawing showing a cut away isometric view of the exemplary belt tensioning assembly of FIG. 4A showing internal detail. FIG. 4E is a drawing showing a isometric view of internal components of the exemplary belt tensioning assembly of FIG. 4A. FIG. 4F is a drawing showing an isometric view of the exemplary belt tensioning assembly of FIG. 4A where the X arms are extended. FIG. 4G is a drawing showing an isometric view of the exemplary belt tensioning assembly of FIG. 4A showing internal detail where the X arms are extended. FIG. 4J is a drawing showing a cut away view of one end of a belt tensioning translating idler roller of the exemplary belt tensioning assembly of FIG. 4A. FIG. 4H is a drawing showing a cut away isometric view of the exemplary belt tensioning assembly of FIG. 4A showing internal detail where the X arms are extended. FIG. 4I is a drawing showing a isometric view of internal components of the exemplary belt tensioning assembly of FIG. 4A where the X arms are extended;

FIG. 4K is a drawing showing a view of a cylinder of the exemplary belt tensioning assembly of FIG. 4A. FIG. 4L is a drawing showing a cut away view of a cylinder of the exemplary belt tensioning assembly of FIG. 4K. FIG. 4M is another drawing showing one end of a belt tensioning translating idler roller the exemplary belt tensioning assembly of FIG. 4A in more detail.

Example— In one exemplary belt tensioning assembly 150 according to the application, spring parameters are k=12.5 lbf/in; O.D.=0.709 in, wire dia.=0.079 in; free length=5.709 in; compressed length=1.614 in, and the x-linkage arms bridge link 401 and link 403 are 10" long links.

A boom deployer to deploy or retract a deformable boom according to the Application includes at least one tensioning assembly. There can also be multiple tensioning assemblies that translate in an opposing direction relative the adjacent tensioners.

Recirculating belt— Any suitable material that can travel over rollers, such as metal rollers without failing can be used. Rollers can incorporate any suitable feature to assist with belt tracking and to prevent belt walking. Suitable featured include, for example, flanged sleeves, crowned pulley features, etc. Rollers can also incorporate grooves (e.g. areas of smaller radii) to allow the belt to sit into the rollers. These grooves prevent "walking", an undesirable effect where the belt can walk along the roller and become skewed, i.e. no longer maintain parallelism with the boom spool. Kevlar belts were used in modeling simulations. Any other type of woven or fiber-based belt can be used. Other suitable belts include metal or plastic belts. One or more belts can be used. The belts can be wide enough to substantially cover the width of the rollers, or narrower, such as, for example, where multiple belts are used. The belt thickness is sized to go over the rollers without excessive fatiguing, e.g., from about 0.001" (e.g., including ~0.0005") to about 0.015". The belt can be sized to react load, such as, including the axial load of the boom to be stowed and deployed. The belt resists blooming as well as reacts to an axial load imparted on the boom by the operational loading of the boom. The belt reacts the load of the rolled boom. There can be a single narrow centered belt, a wide belt, or any suitable plurality of belts. For example, multiple belts can be placed to react to the load bearing sections of a boom (e.g., the unidirectional longerons shown on either side of the deploying boom of FIG. 1, each of the belts shown over a longeron of the boom)

Frame— The frame can be made from any suitable substantially rigid material, such as, for example, and suitable metal. Exemplary suitable metals include aluminum, titanium, steel. Composite materials can also be used. Experimental implementations were made with polylactic acid (PLA) 3D printed material. Any suitable fasteners, typically machine screws can be used.

FIG. 5A is a drawing showing an elevated view of a belt tensioning assembly 150 in a nearly retracted position imparting a minimal force on the recirculating belt 103. FIG. 5B is a drawing showing an elevated view of a belt tensioning assembly 150 in a nearly fully extended position. The linkage output force profile is determined by springs and linkage length selection. Typically, a maximum output force is somewhere in the middle of deployment.

The selection of both linkages and springs allows for a customizable force-travel profile.

FIG. 5C is a graph showing transmission angle vs. static output force. FIG. 5D is a graph showing spring displacement vs. static output force.

FIG. 6A is a drawing showing an isometric view of an exemplary integrated motor-spool assembly 120. FIG. 6B is a drawing showing a cutaway view of the integrated motor-spool assembly 120 of FIG. 6A. In the exemplary integrated motor-spool assembly 120 of FIG. 6A and FIG. 6B, the boom spool 121 is connected to the motor sleeve 603 by spoked hubs. The motor mounts to the motor sleeve by a bolt pattern of the motor 601 (any suitable means can be used to fasten to motor to the motor sleeve, such as for example, press fit, key fit, glues, adhesives, etc.). Snap rings 671 hold flanged sleeve bearings 661, 663, and 665 in place such that entire assembly is held together. Any suitable number of sleeve bearings can be used. Any suitable means to affix the sleave ring in place can be used with either of one or both bearing surfaces free to rotate. Any suitable means can be used hold the sleeve bearings in place. Bearings can be made from any suitable material, such as, for example, Teflon and Brass which were used in modeling simulations of exemplary flanged bearings held in by snap rings.

Figure 6C:
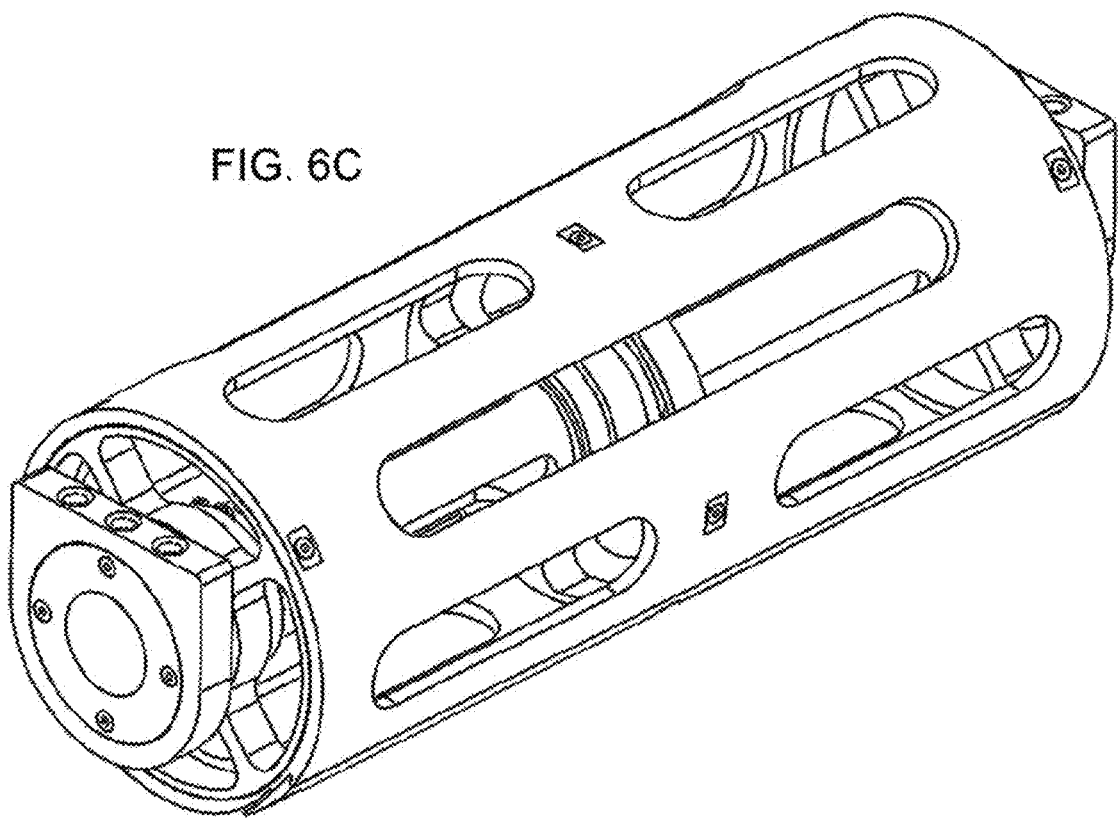
FIG. 6C is a drawing showing an isometric view of the integrated motor-spool assembly of FIG. 6A.
Figure 6D:
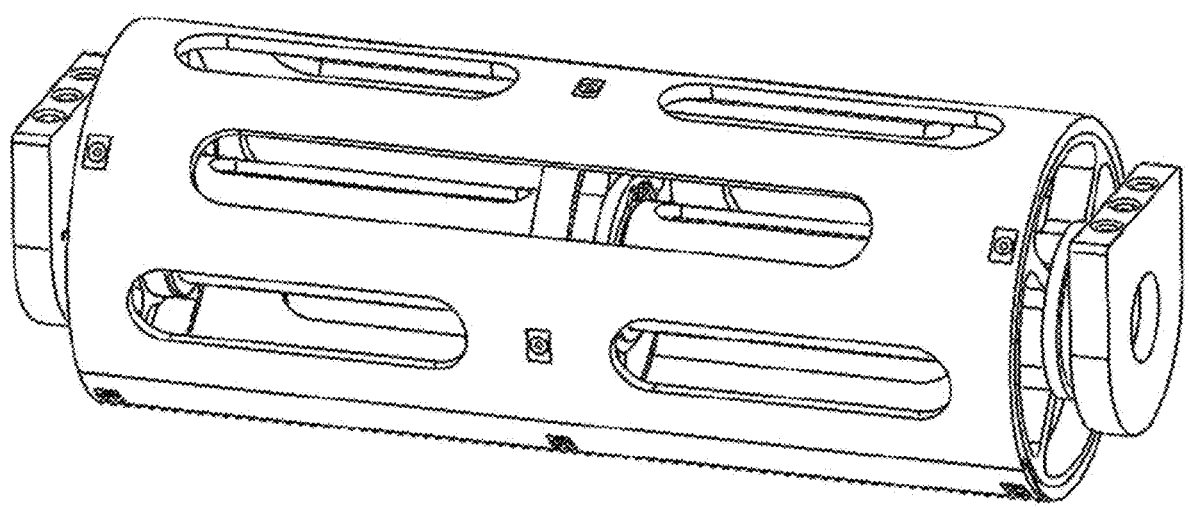
FIG. 6D is a drawing showing an axonometric view of the integrated motor-spool assembly of FIG. 6A.
Figure 6E:
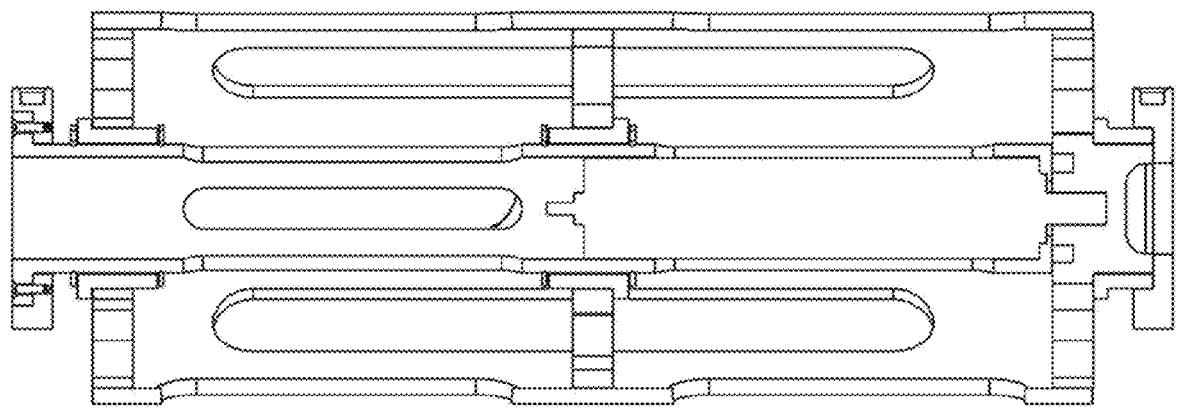
FIG. 6E is a drawing showing a cutaway side view of the integrated motor-spool assembly of FIG. 6A.
Figure 6F:
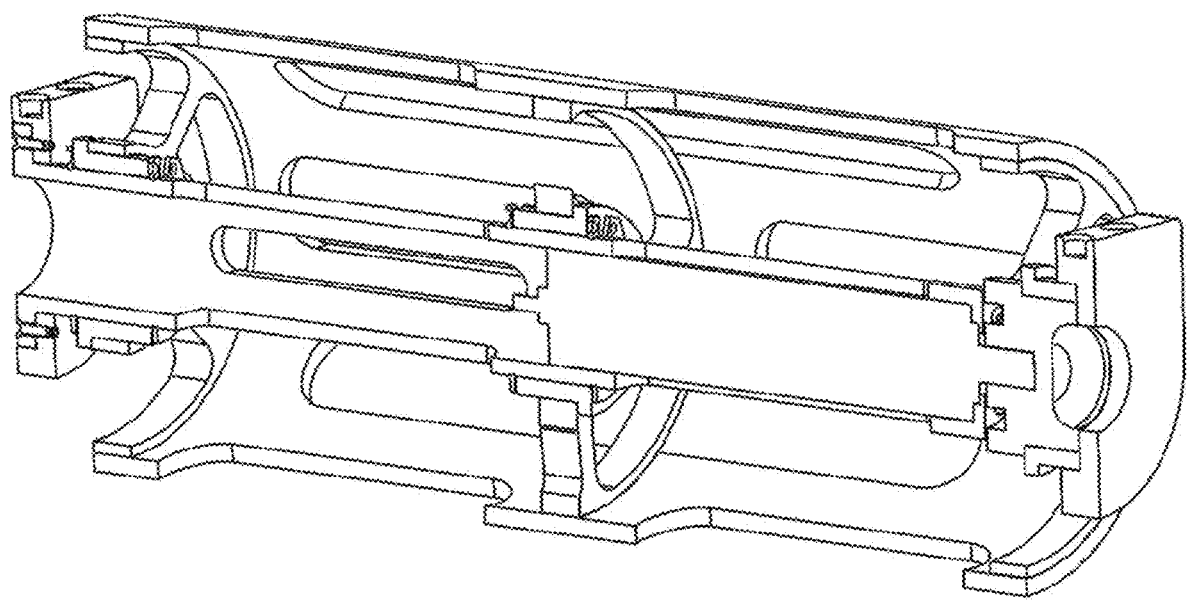
FIG. 6F is a drawing showing a cutaway axonometric view of the integrated motor-spool assembly of FIG. 6A.
Figure 6G:
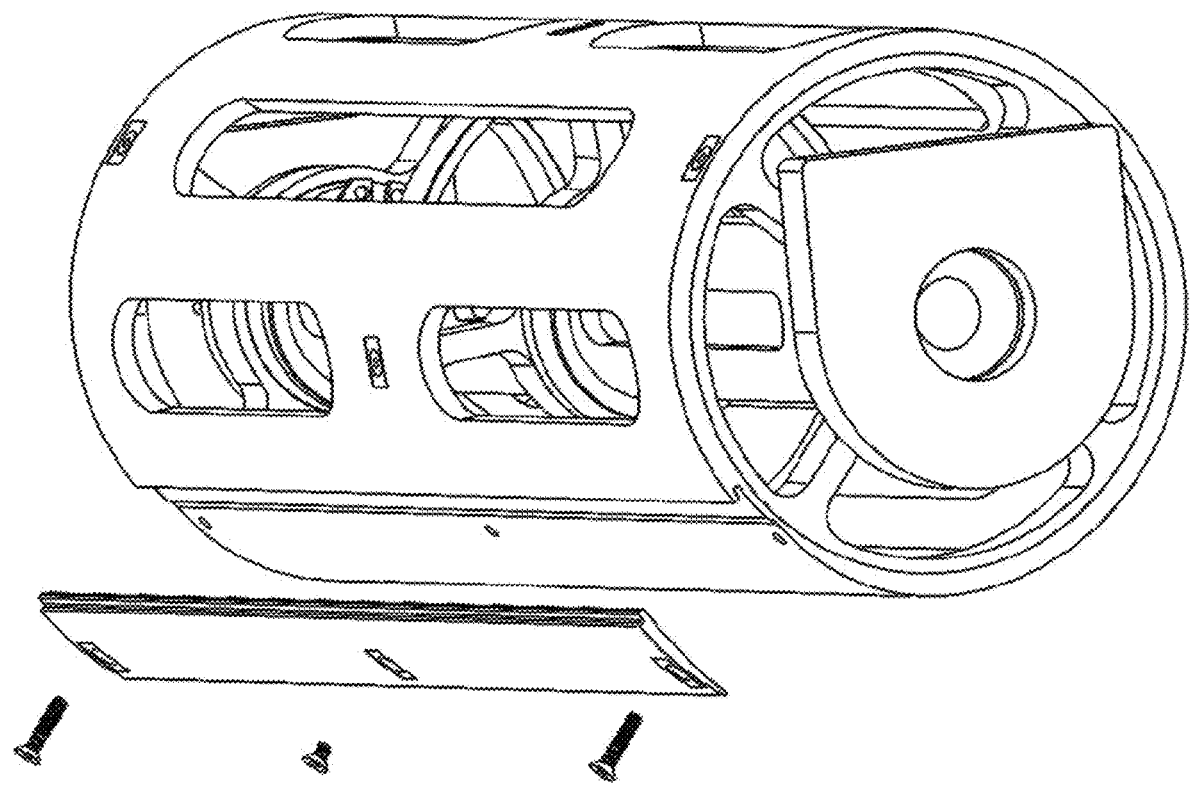
FIG. 6G is a drawing showing an exploded axonometric view of the integrated motor-spool assembly of FIG. 6A with a clamp.

FIG. 6C is a drawing showing an isometric view of the integrated motor-spool assembly of FIG. 6A. FIG. 6D is a drawing showing an axonometric view of the integrated motor-spool assembly of FIG. 6A. FIG. 6E is a drawing showing a cutaway side view of the integrated motor-spool assembly of FIG. 6A. FIG. 6F is a drawing showing a cutaway axonometric view of the integrated motor-spool assembly of FIG. 6A. FIG. 6G is a drawing showing an exploded axonometric view of the integrated motor-spool assembly of FIG. 6A with a clamp.

The integrated motor-spool assembly can include a stationary motor disposed within, where the motor is rotationally fixed relative to the deployer frame, and the boom spool is not. The boom spools rotation is driven by the output of the fixed motor. Note that a a gearhead can optionally be coupled to the motor output shaft to increase the drive torque.

The integrated motor-spool assembly can rotate on a plurality of bearings about the stationary motor disposed within. The plurality of bearings including needle bearings, ball bearings, or journal bearings. Journal bearings can be made of any suitable low friction material: phosphor bronze, PTFE polymer, etc.

The boom is typically mechanically coupled at one end of the boom to the motor-spool assembly, such as, for example, by a boom securement clamp.

Boom Securement Clamp— A boom securement clamp can be added to the motor-spool assembly to allow the boom to be fastened to the spool. A boom securement clamp can be made such as by cutting out a channel for the boom to slot into. A top portion of the slot can be cut out of the spool to become a separate piece. Any suitable clamping technique can be used, such as, for example, a separate assembly that clamps onto the root end of the boom first which can be fastened to the boom spool by any suitable fastening technique for ease of assembly.

Figure 7A:
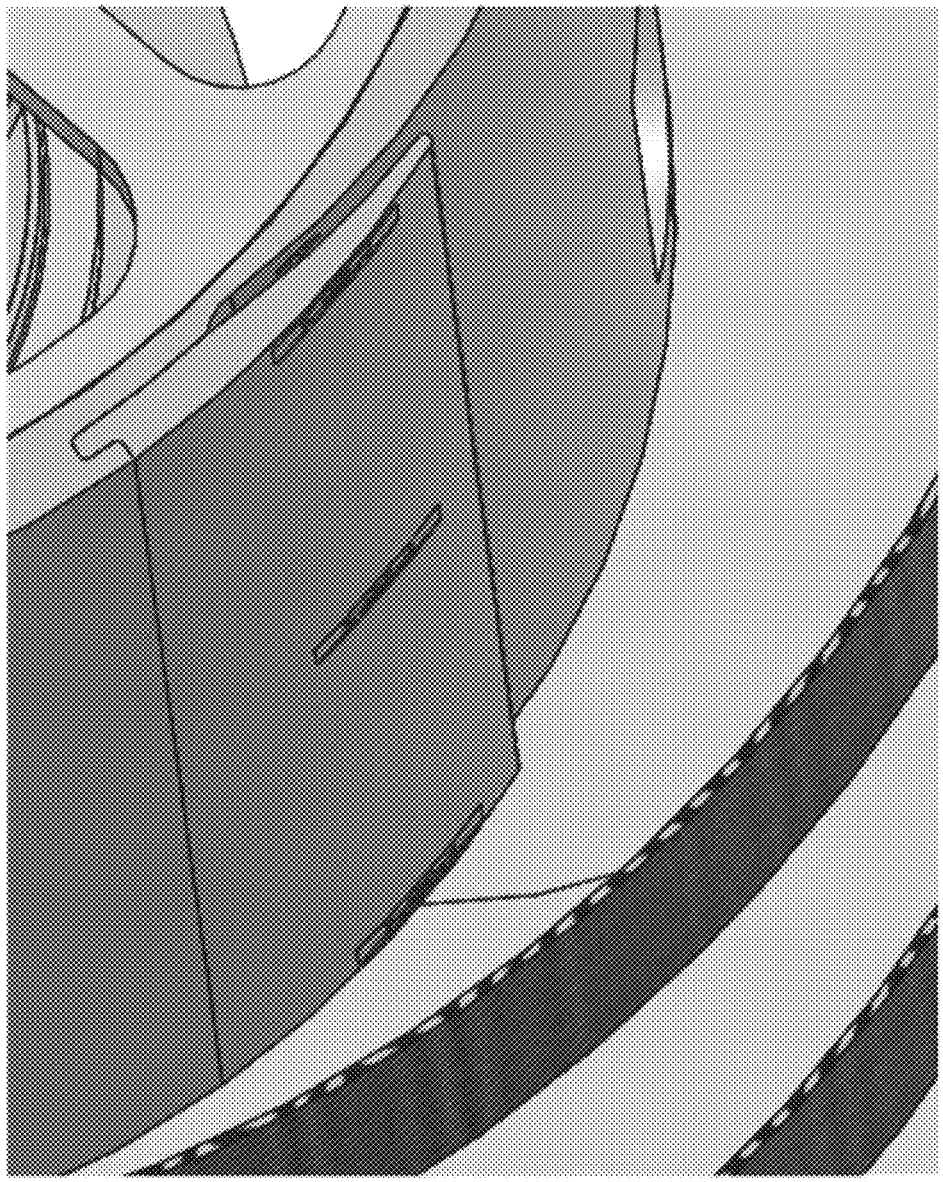
FIG. 7A is a drawing showing the exemplary boom securement clamp according to the Application.

FIG. 7A is a drawing showing an exemplary boom securement clamp according to the Application. The spool end of the exemplary boom securement clamp of FIG. 7A, has 3 through holes drilled into it to allow flat head screws to pass through it such that the clamping piece can be fastened down on top of the boom. The boom can be so held in place, such as for example, by use of 3 pins and the clamping force of the boom clamp.

Figure 7B:
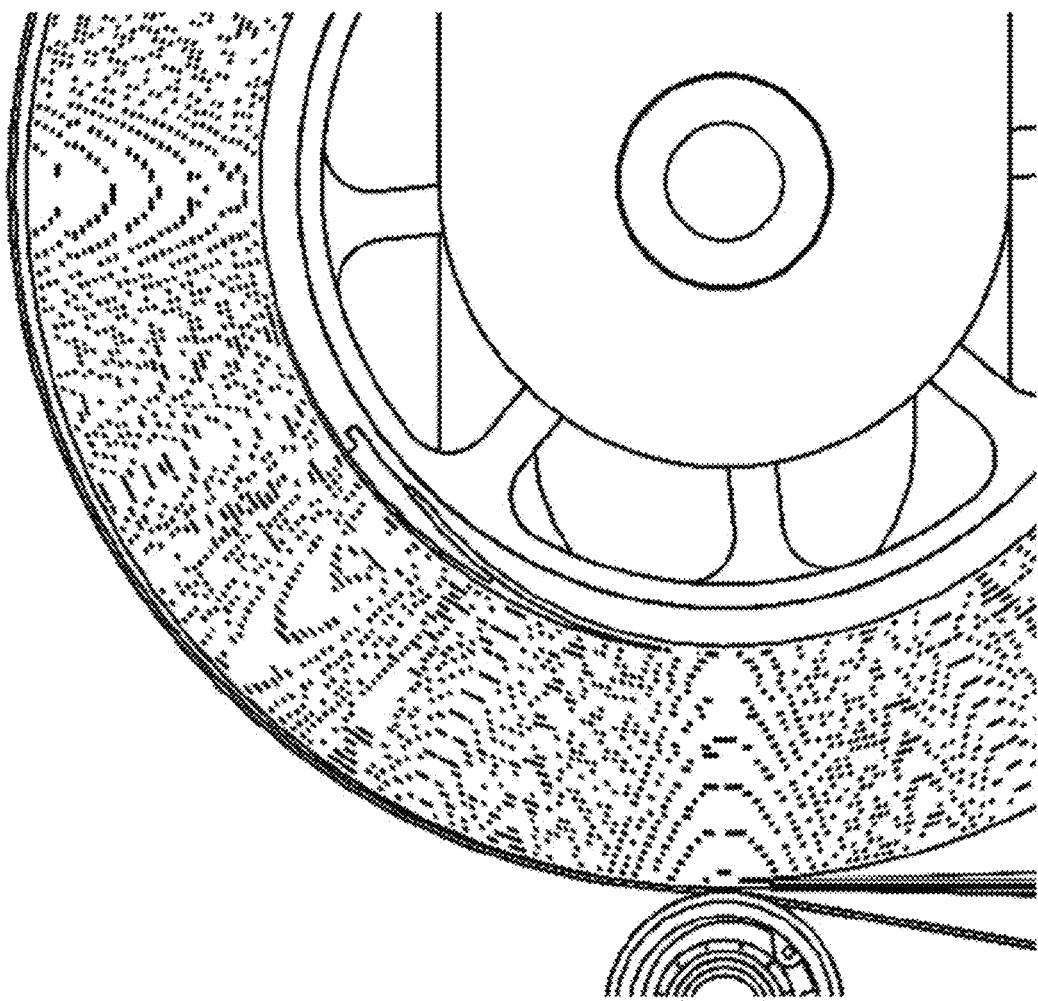
FIG. 7B is a drawing showing a side view of the exemplary boom securement clamp of FIG. 7A with a rolled boom.
Figure 7C:
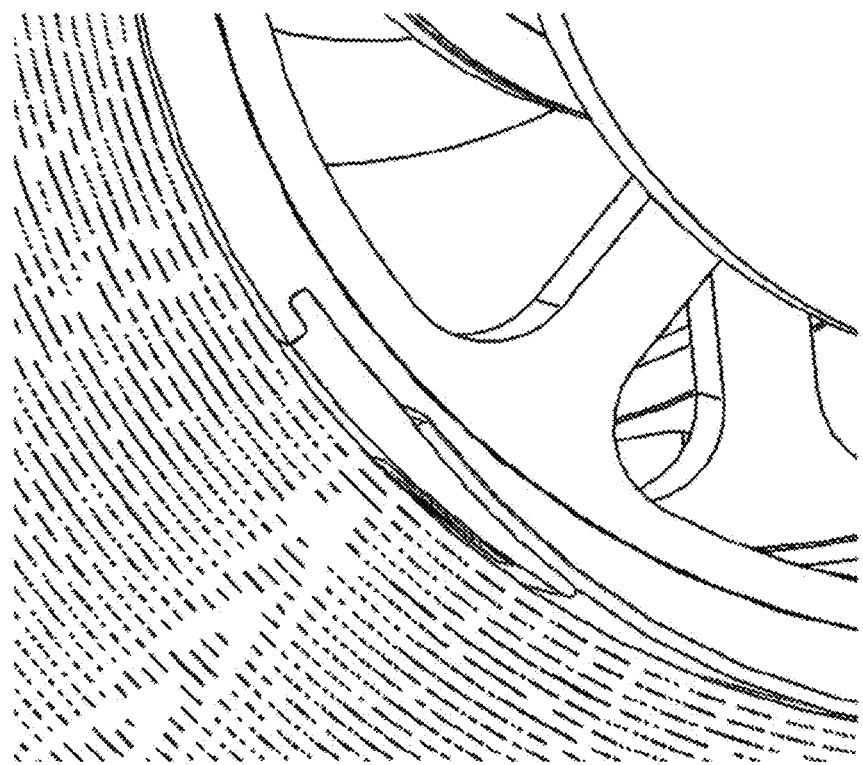
FIG. 7C is a drawing showing an elevated side view of the exemplary boom securement clamp of FIG. 7A with a rolled boom.
Figure 7D:
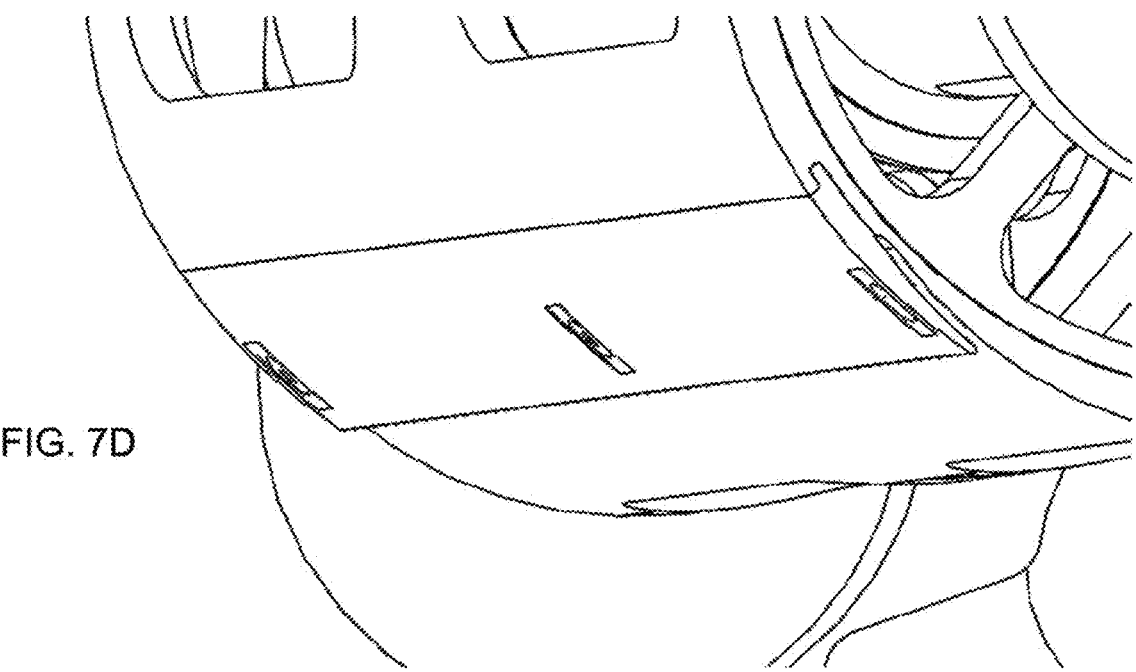
FIG. 7D is drawing showing another elevated side view of an exemplary boom securement clamp of FIG. 7A.

FIG. 7B is a drawing showing a side view of the exemplary boom securement clamp of FIG. 7A with a rolled boom. FIG. 7C is a drawing showing an elevated side view of the exemplary boom securement clamp of FIG. 7A with a rolled boom. FIG. 7D is drawing showing another elevated side view of the exemplary boom securement clamp of FIG. 7A.

The boom securement clamp can be made so as to be detachable from the boom spool to allow the boom securement clamp to be assembled onto the boom prior to boom installation/mating with the boom spool. The securement clamp can be secured via fasteners or clips to the boom spool itself.

Example—The motor 601 is mechanically coupled to the motor sleeve 603. The motor sleeve 603 is fixed to the sliders 631a, 631b. Sliders 631a, 631b translate according to the boom spool vertical translation direction arrow 171. The rotatable motor shaft 613 is mechanically coupled to a spoked hub 641. The motor shaft 613 can be keyed. Each of the spoked hubs 641 are mechanically coupled to the boom spool 121. The boom spool 121 can be made from any suitable substantially rigid material. The exemplary boom spool 121 was modeled in aluminum. When the motor 601 is energized, motor shaft 613 causes the boom spool to rotate about the motor sleeve 603, and the motor sleeve 603 can move through a vertical translation within the boom deployer frame assembly 160, however motor sleeve 603 does not rotate with respect to the frame.

Root End Guide— A boom deployer according to the Application typically includes a root end guide. The root end guide serves to react bending along the centerline plane perpendicular to a flange plane according to the exemplary deployer of FIG. 1, and more generally typically parallel with a deployer side-wall plane also referred to as a sideplate. The guide can be, for example, a rigid cross-section guide. A rigid cross-section guide can be shaped such that the boom will only contact the guide once the boom has reached full deployment. There can be sprung flange compressor-guides on either side of the boom that assist in holding the root cross section open to ensure contact with the rigid guide such that the guide can react load effectively. Components of a root end guide can be made, for example, of a metal (steel, aluminum, titanium, magnesium, etc.). Components that slide can be made of any suitable materials for low friction sliding. The central rigid guide portion can be made of carbon fiber composite. The flange sliders can be made of polymeric material like Teflon or any suitable low friction alloy like phosphor bronze.

Figure 8A:
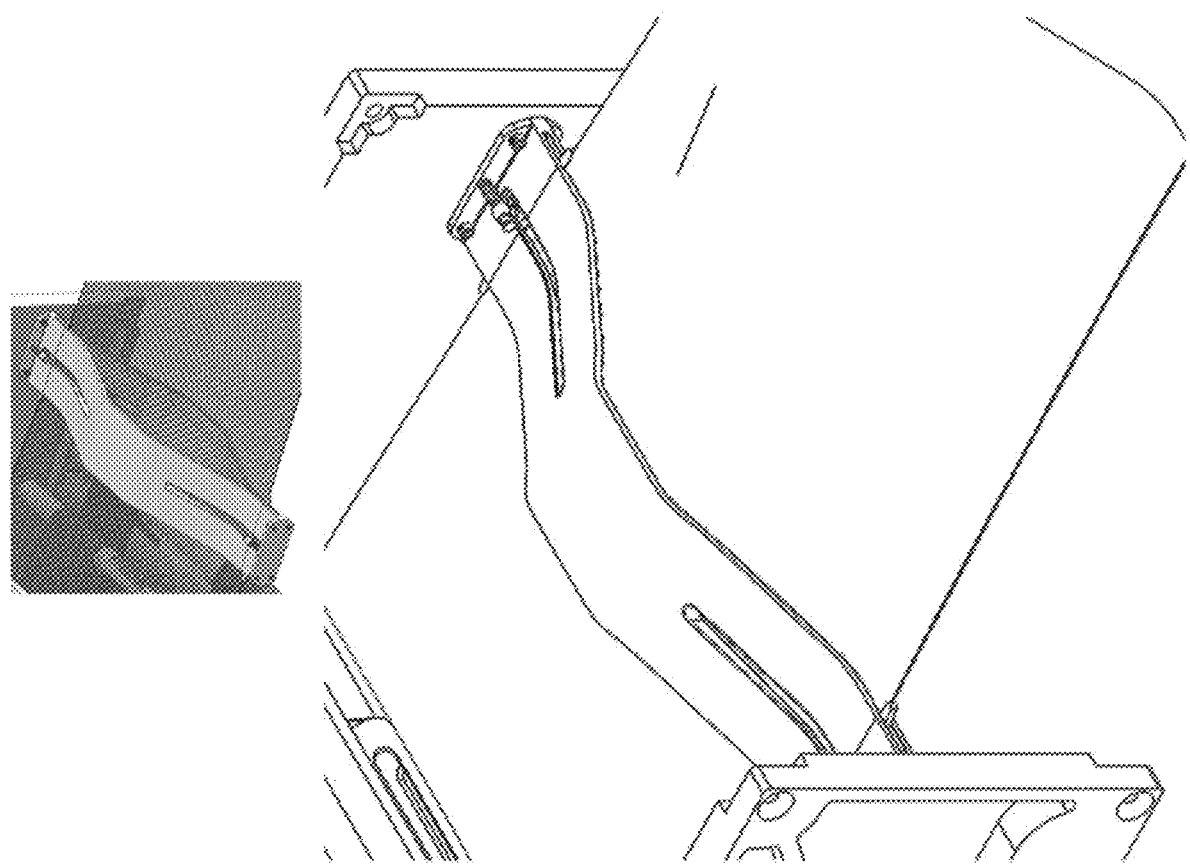
FIG. 8A is a drawing showing an exemplary rigid cross-section root end guide according to the Application.

FIG. 8A is a drawing showing an exemplary rigid cross-section root end guide according to the Application. Note that while the boom profile portion of the root end guide is rigid, the flange guide portion of the guide morphs to accommodate boom deformation. The flange guide portion of the guide morphs along the flanges to accommodate flange separation change as the boom deforms during deployment/retraction cycles.

Figure 8B:
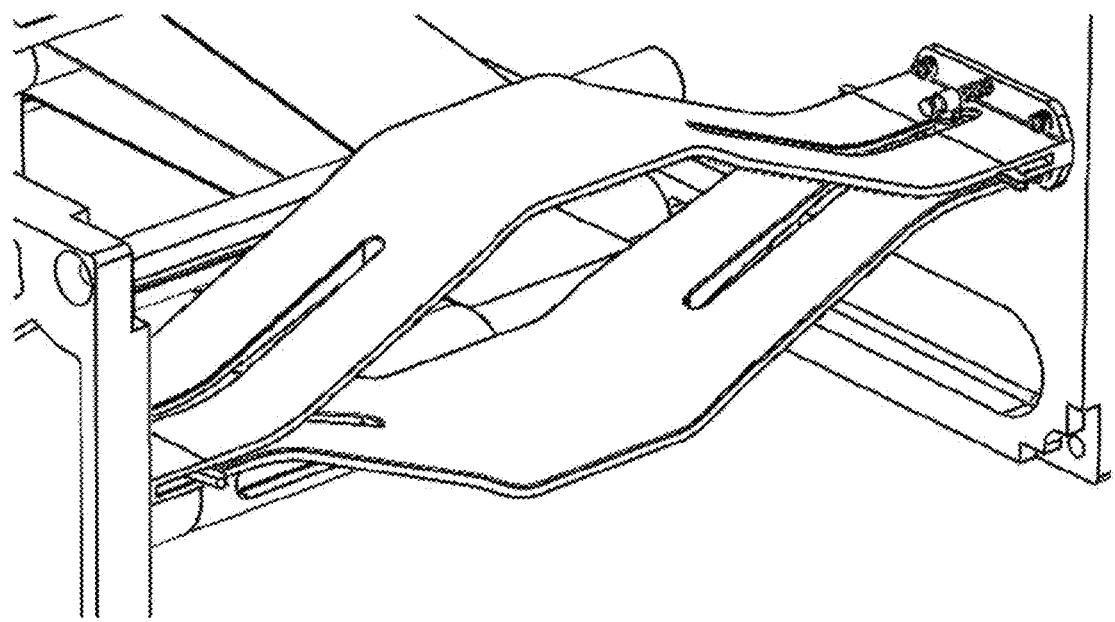
FIG. 8B is a drawing showing an isometric view of the exemplary rigid cross-section root end guide of FIG. 8A.
Figure 8C:
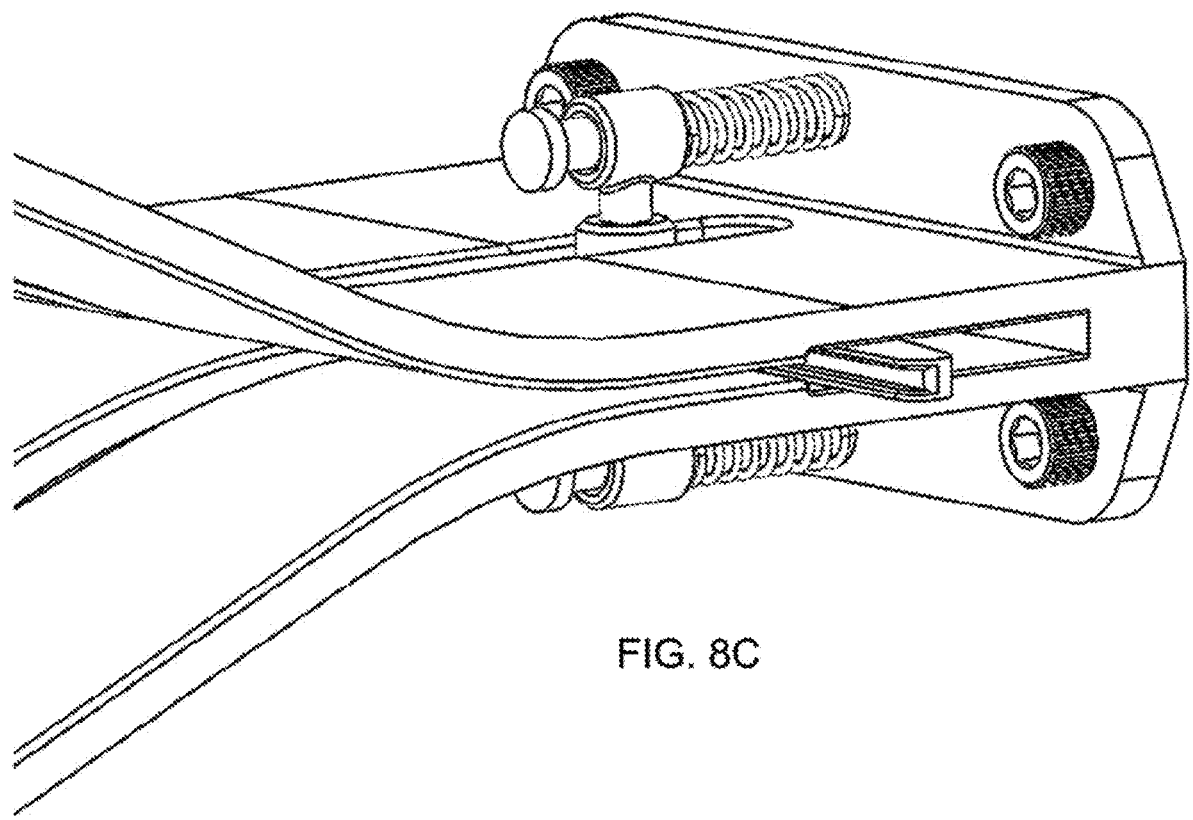
FIG. 8C is a drawing showing an elevated side view of the exemplary rigid cross-section root end guide of FIG. 8A.
Figure 8D:
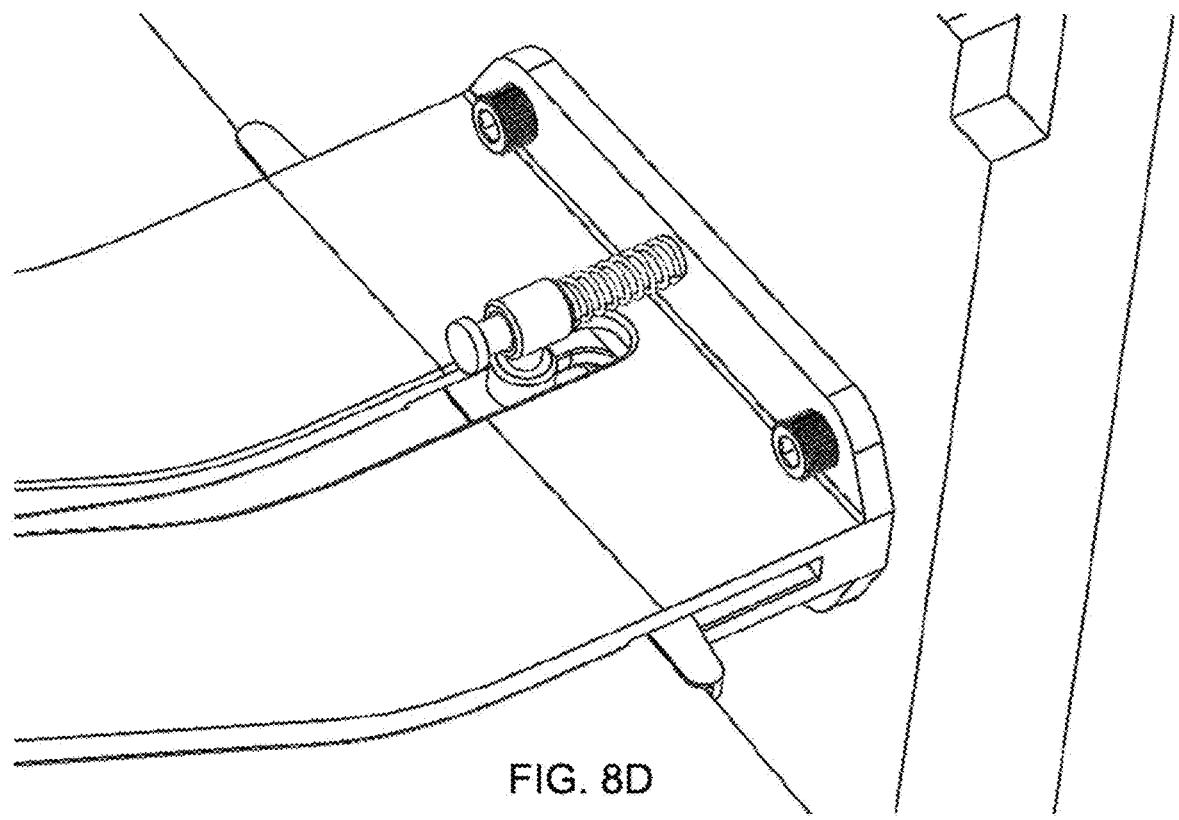
FIG. 8D is a drawing showing an elevated side view with more detail of one side of the exemplary rigid cross-section root end guide of FIG. 8A.
Figure 8E:
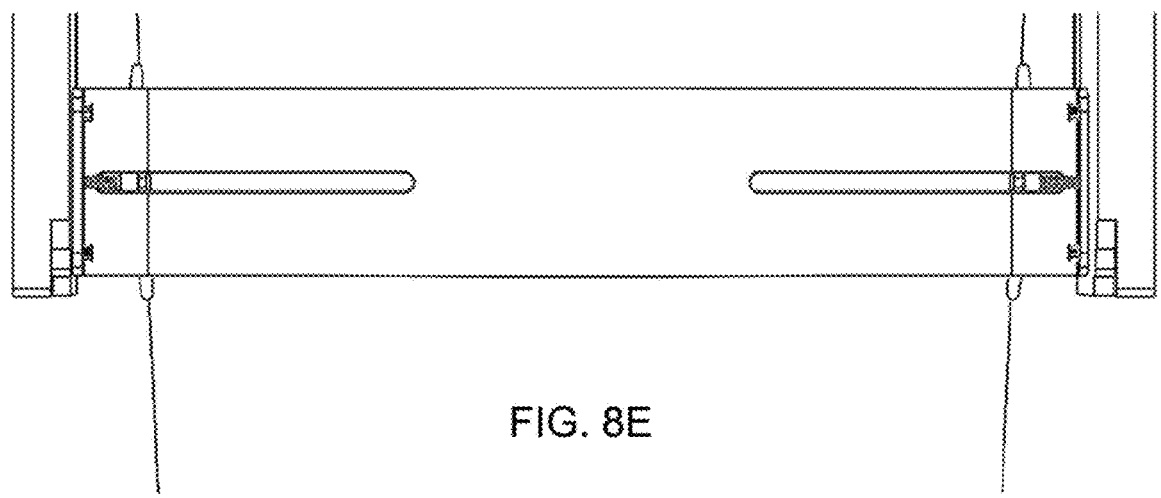
FIG. 8E is a drawing showing a top view of the exemplary rigid cross-section root end guide of FIG. 8A.

FIG. 8B is a drawing showing an isometric view of the exemplary rigid cross-section root end guide of FIG. 8A. FIG. 8C is a drawing showing an elevated side view of the exemplary rigid cross-section root end guide of FIG. 8A. FIG. 8D is a drawing showing an elevated side view with more detail of one side of the exemplary rigid cross-section root end guide of FIG. 8A. FIG. 8E is a drawing showing a top view of the exemplary rigid cross-section root end guide of FIG. 8A.

Distal End Interface— A distal end interface feature can assist a deployed end of the boom with proper load reaction while also allowing the boom cross-section to change as it needs to during deployment and retraction cycles. The distal end interface can be secured, such as by fastening the distal end interface to the free end of the boom. The distal end interface can morph along with the boom cross-section when the boom is undeployed. A morphing distal end interface can react to axial loading of the longerons within the boom and allows interfacing with operational loads. Moving/Morphing—Moving/morphing as described hereinabove and as described and illustrated in the Application, purposely allows a boom to package more compactly. The distance from where a boom is flattened to where it regains its shape/cross section can be from 5 to 20 times the diameter or flattened width of the boom. By allowing the cross section to change at the root and distal end, the boom can be retracted much further and nearly fully rolled. This feature allows the deployer assembly to be much shorter than it would be without allowing the cross section to flatten.

Figure 9A:
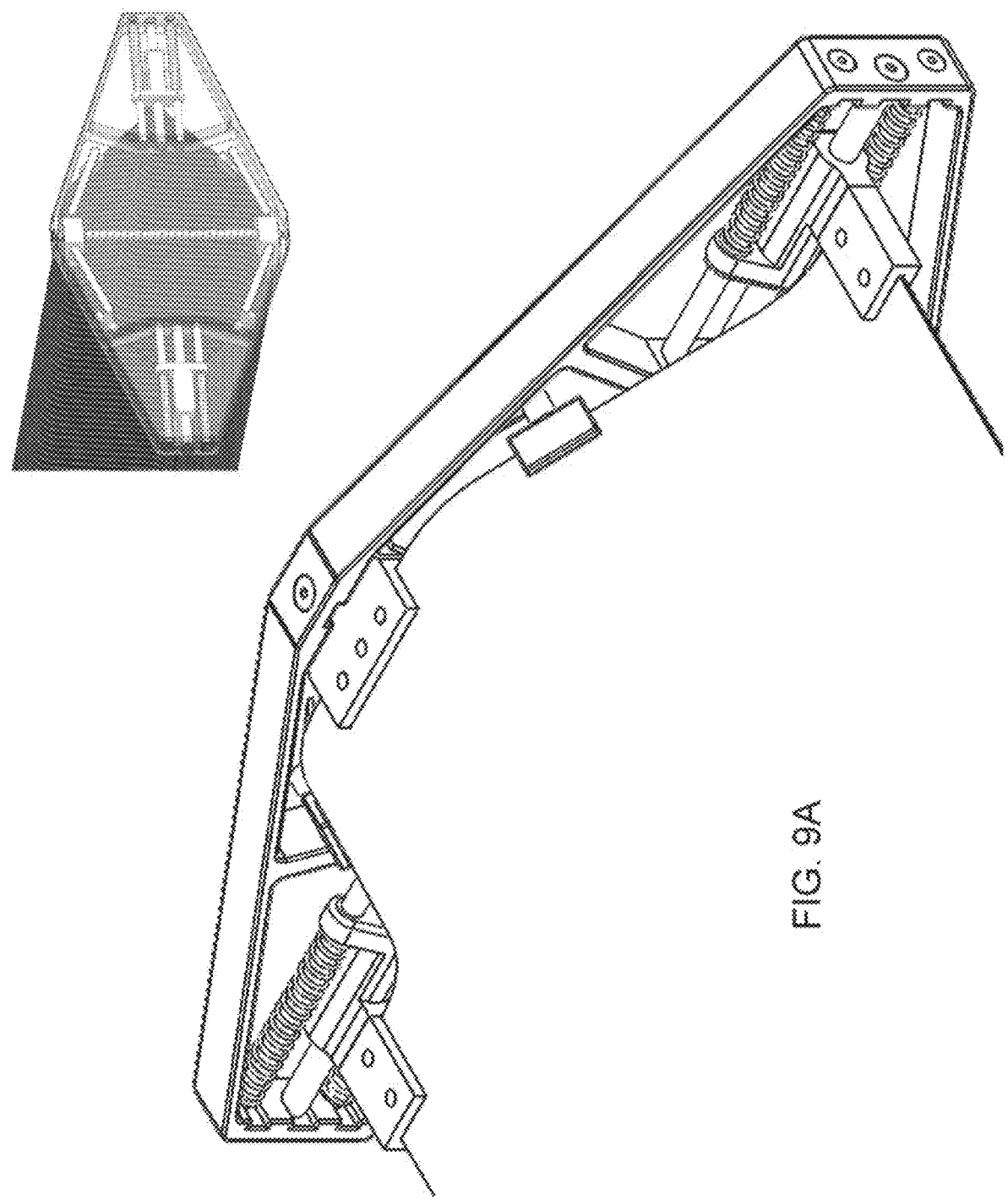
FIG. 9A is a drawing showing an exemplary distal end interface according to the Application.

FIG. 9A is a drawing showing an exemplary distal end interface according to the Application. The distal end interface can be fixed to the boom, for example, at 4 points, a clamp at each flange and a clamp at the top and bottom flats of the boom. Additionally, there can be 4 sliding interfaces that slide along the diagonal elements of the boom which pivot at vertically translating elements. These sliders can react loading at the longerons and provide a load path from the longerons to the backplate of the distal end interface. Alternatively, sliding interfaces or fixed interfaces at the longeron loading area can be blocks that are fixed to the longeron ends and contact the interface backplate directly, extensions of the longeron portion of the boom itself, or any other suitable structure that allows a reliable load path from the longerons to the backplate of the interface. The translating elements of the interface can be sprung (spring biased) to help ensure that the boom reaches its full cross-section (fully deployed cross-section) and structural loading capacity. The boom will overcome the spring forces when retracted to take a flattened shape upon stowage. A distal end interface can be made of metal (steel, aluminum, titanium, magnesium, etc.). Sliding elements can be made of any suitable metal or polymers (or any material with sufficiently low coefficients of static and kinetic friction), such as, for example, a phosphor bronze, a fluorocarbon polymer, etc.

Figure 9B:
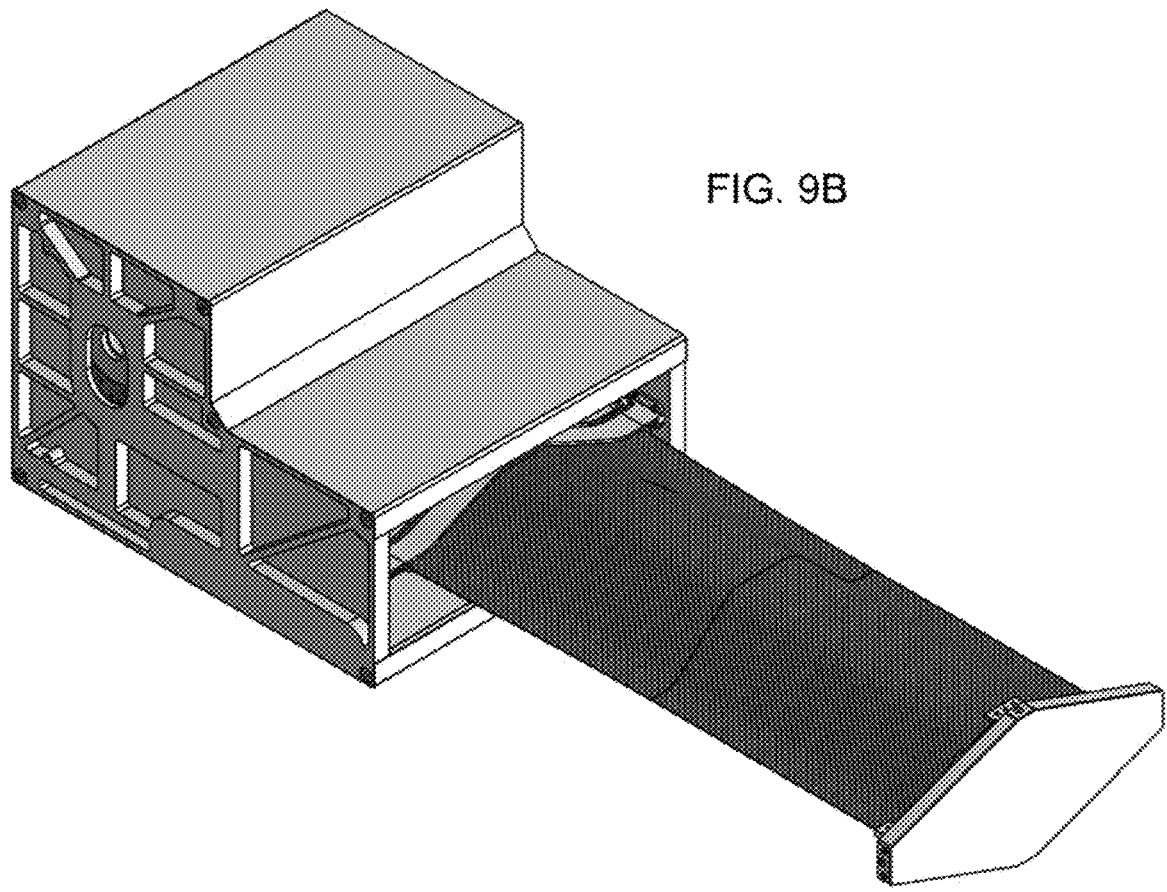
FIG. 9B is a drawing showing a boom deployer with a partially extended boom having an exemplary distal end interface according to FIG. 9A.
Figure 9C:
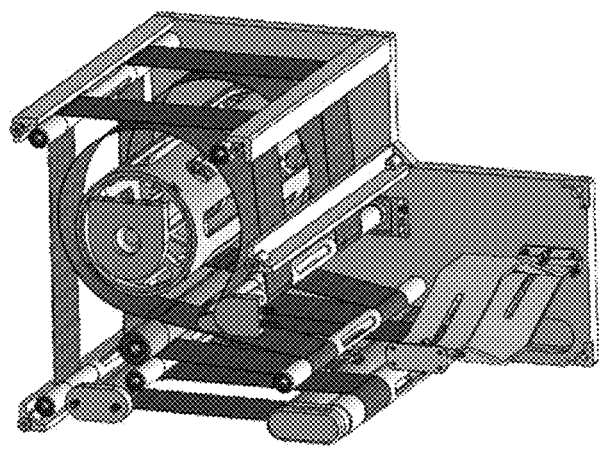
FIG. 9C is a drawing showing a cut away view of a boom deployer suitable for use with a boom having a distal end interface according to FIG. 9A.
Figure 9D:
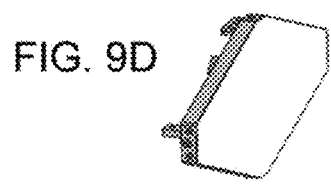
FIG. 9D is a drawing showing an axonometric view of a distal end interface according to FIG. 9A.
Figure 9E:
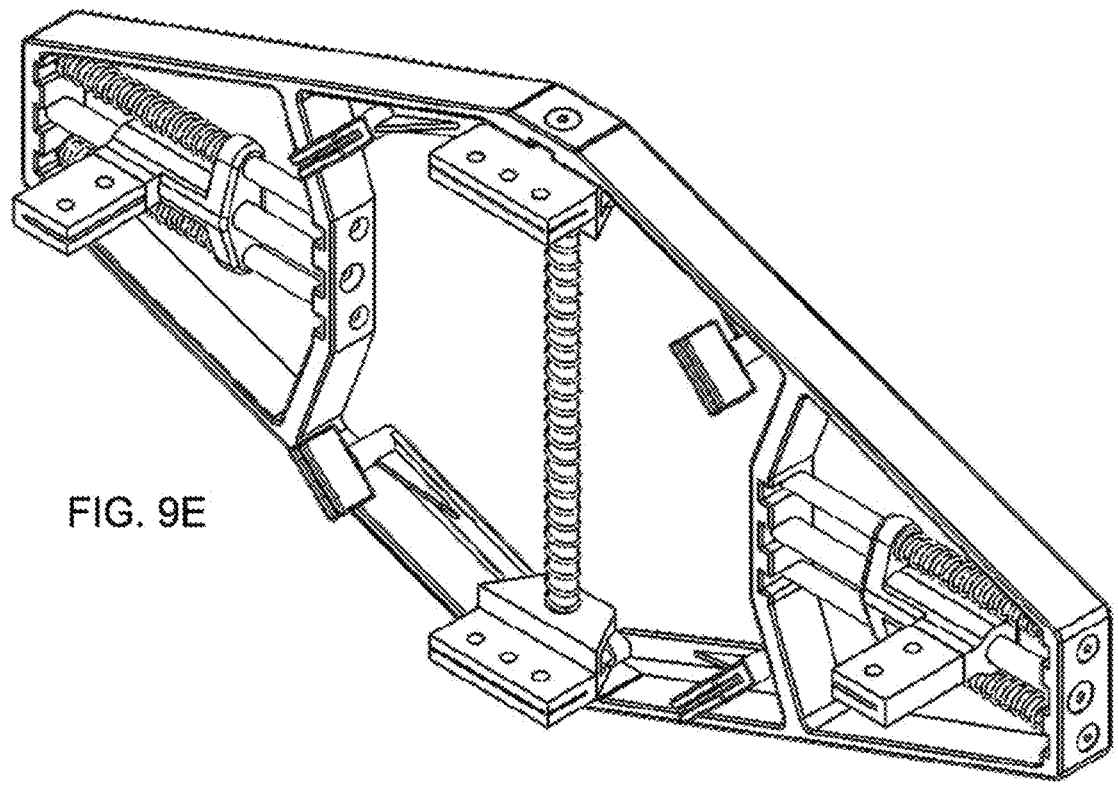
FIG. 9E is a drawing showing an isometric view of the internal components of an exemplary distal end interface according to FIG. 9A.
Figure 9F:
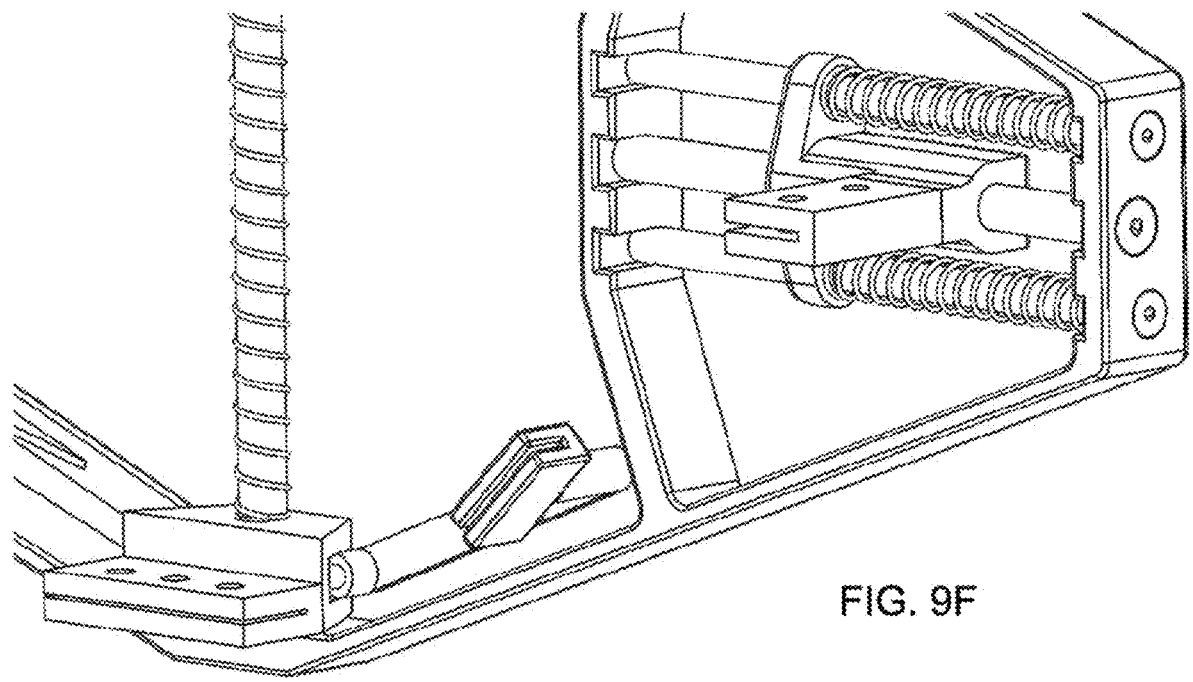
FIG. 9F is a drawing showing a more detailed view of one side of the internal components of an exemplary distal end interface according to FIG. 9A.
Figure 9G:
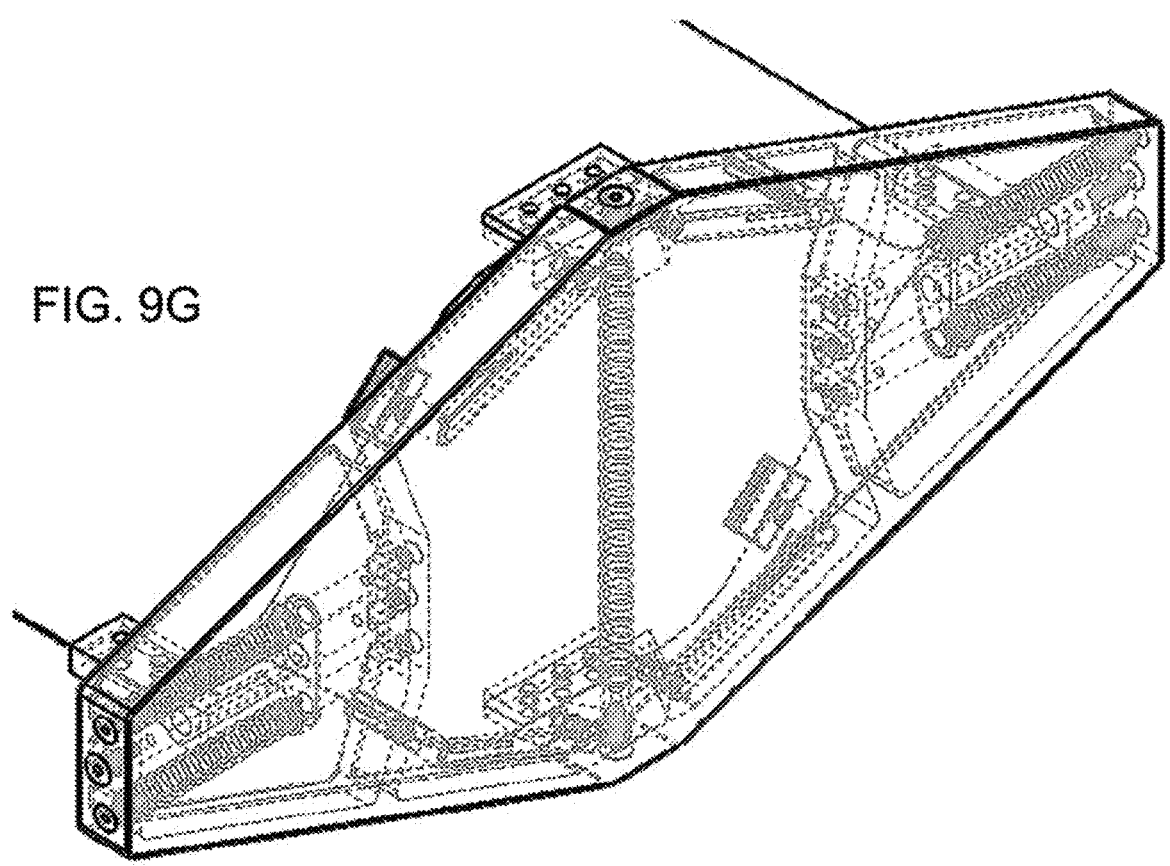
FIG. 9G is a drawing showing a more detailed transparent view of the internal components of an exemplary distal end interface according to FIG. 9A.
Figure 9H:
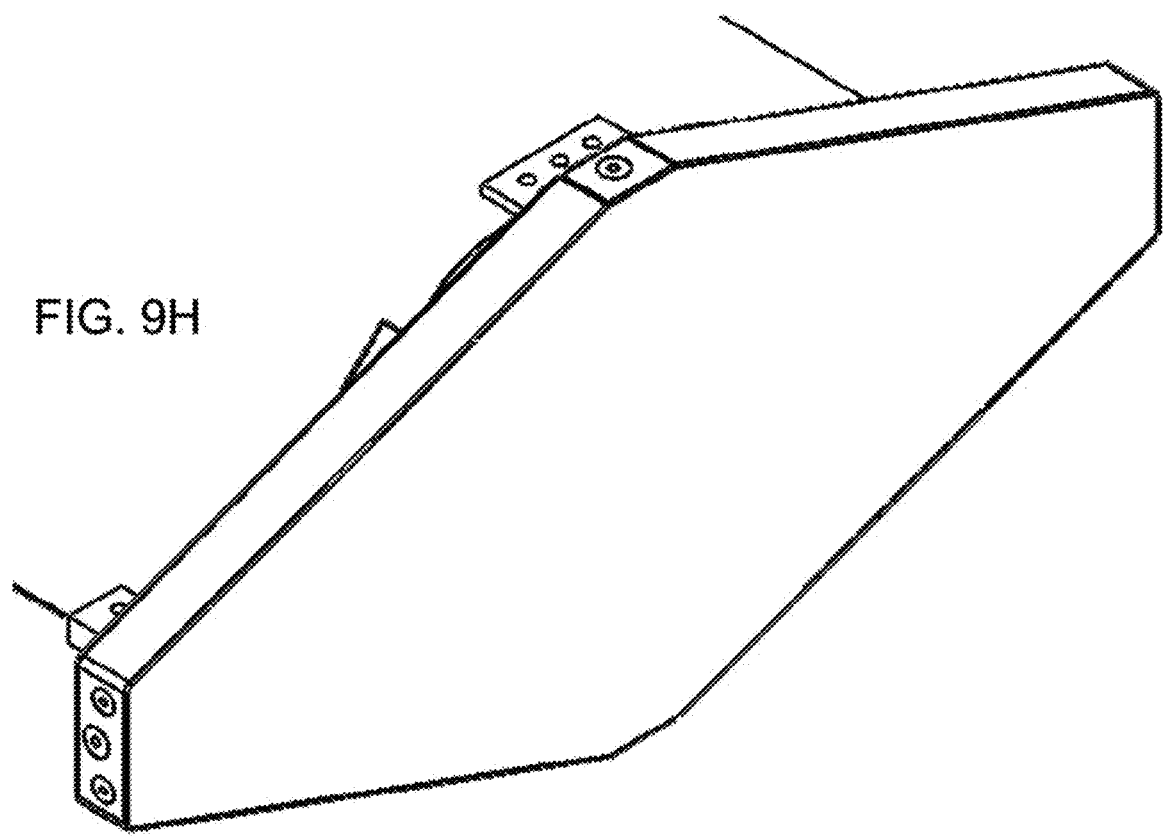
FIG. 9H is a drawing showing an isometric view of the exemplary distal end interface according to FIG. 9A.

FIG. 9B is a drawing showing a boom deployer with a partially extended boom having an exemplary distal end interface according to FIG. 9A. FIG. 9C is a drawing showing a cut away view of a boom deployer suitable for use with a boom having a distal end interface according to FIG. 9A. FIG. 9D is a drawing showing an axonometric view of a distal end interface according to FIG. 9A. FIG. 9E is a drawing showing an isometric view of the internal components of an exemplary distal end interface according to FIG. 9A. FIG. 9F is a drawing showing a more detailed view of one side of the internal components of an exemplary distal end interface according to FIG. 9A. FIG. 9G is a drawing showing a more detailed transparent view of the internal components of an exemplary distal end interface according to FIG. 9A. FIG. 9H is a drawing showing an isometric view of the exemplary distal end interface according to FIG. 9A.

Figure 10:
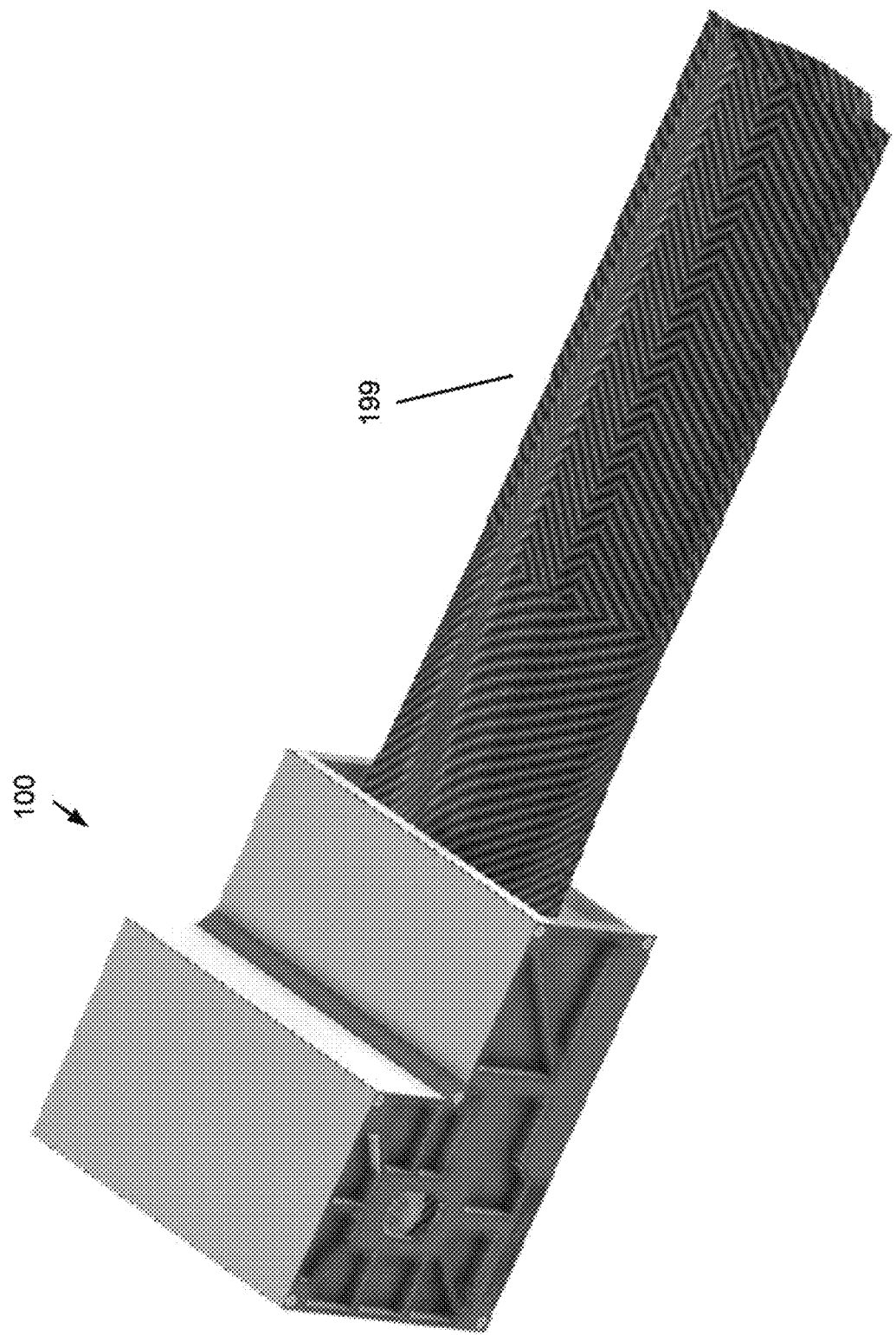
FIG. 10 is a drawing showing an isometric view of a boom deployer according to the Application.

FIG. 10 is a drawing showing an isometric view of a boom deployer 100 according to the Application, deploying or retracting a deformable boom 199 according to the Application. The boom deployer 100 enables a full extension and retraction of an exemplary collapsible tubular mast (CTM) boom. Tensioned, the recirculating belt 103 resists blooming during both retraction and extension. The tensioning mechanism, belt tensioning assembly 150, allows for a more linear exertion of tensioning force throughout deployment and retraction.

Figure 11:
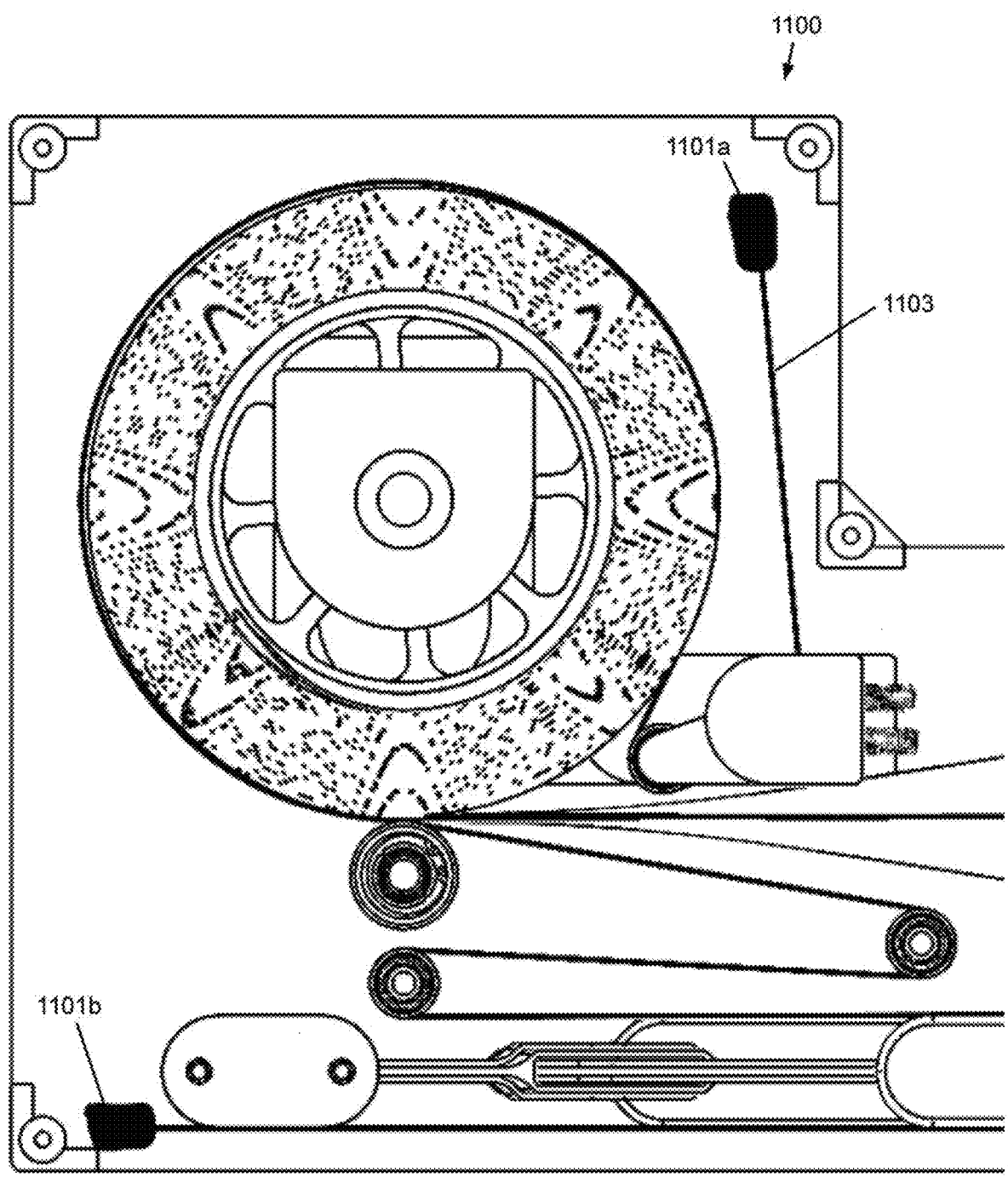
FIG. 11 is a drawing showing yet another implementation of boom deployer with a stationary belt.

FIG. 11 is a drawing showing yet another implementation of boom deployer with a stationary belt, where the belt does not roll. Belt 1103 of deployer 1100 is fixed at anchor points 1101a and 1101b. Belt 1103 serves as a sliding consolidation surface that puts pressure on the boom to hold it rolled and where the boom just slides on it. In this case, the belt 1103 would be anchored and one end and tensioned on the other as indicated by the anchor points 1101a, 1101b. Note that this implementation also uses a tensioning mechanism, such as, for example, belt tensioning assembly 150 as described hereinabove.

Generally, a stationary belt should have a sufficiently low coefficient of friction to allow for proper sliding of the boom against the belt without causing binding of the boom. Materials such as, for example, PTFE (Teflon), conveyor belt materials, Kevlar™, thin metallic sheet, or other materials with a dry film lubrication layer or coating can be used.

Figure 12A:
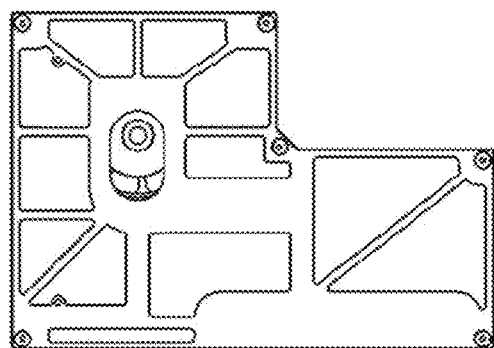
FIG. 12A is a side view of an exemplary boom deployer according to the Application, showing a deformable boom expanding on deployment.
Figure 12B:
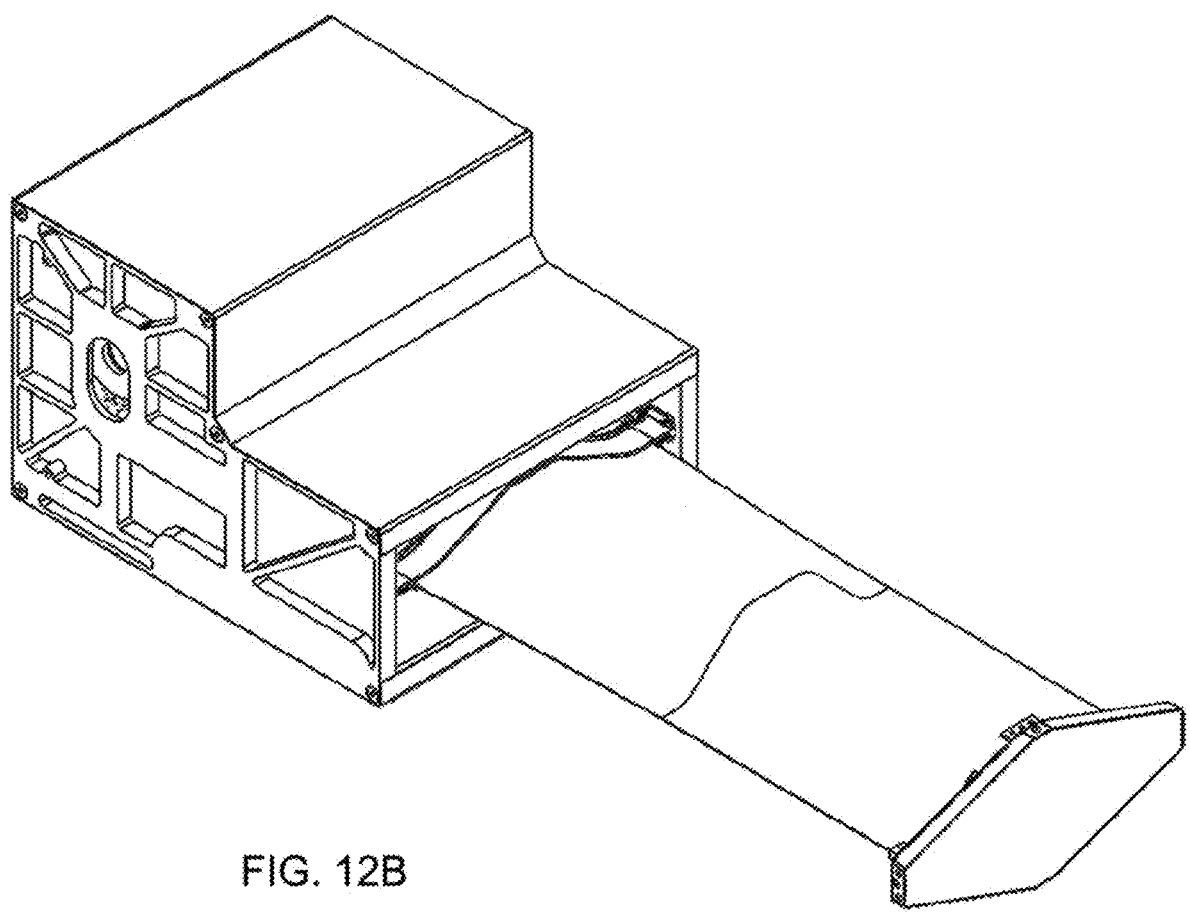
FIG. 12B is an isometric view of the boom deployer of FIG. 12A.
Figure 12C:
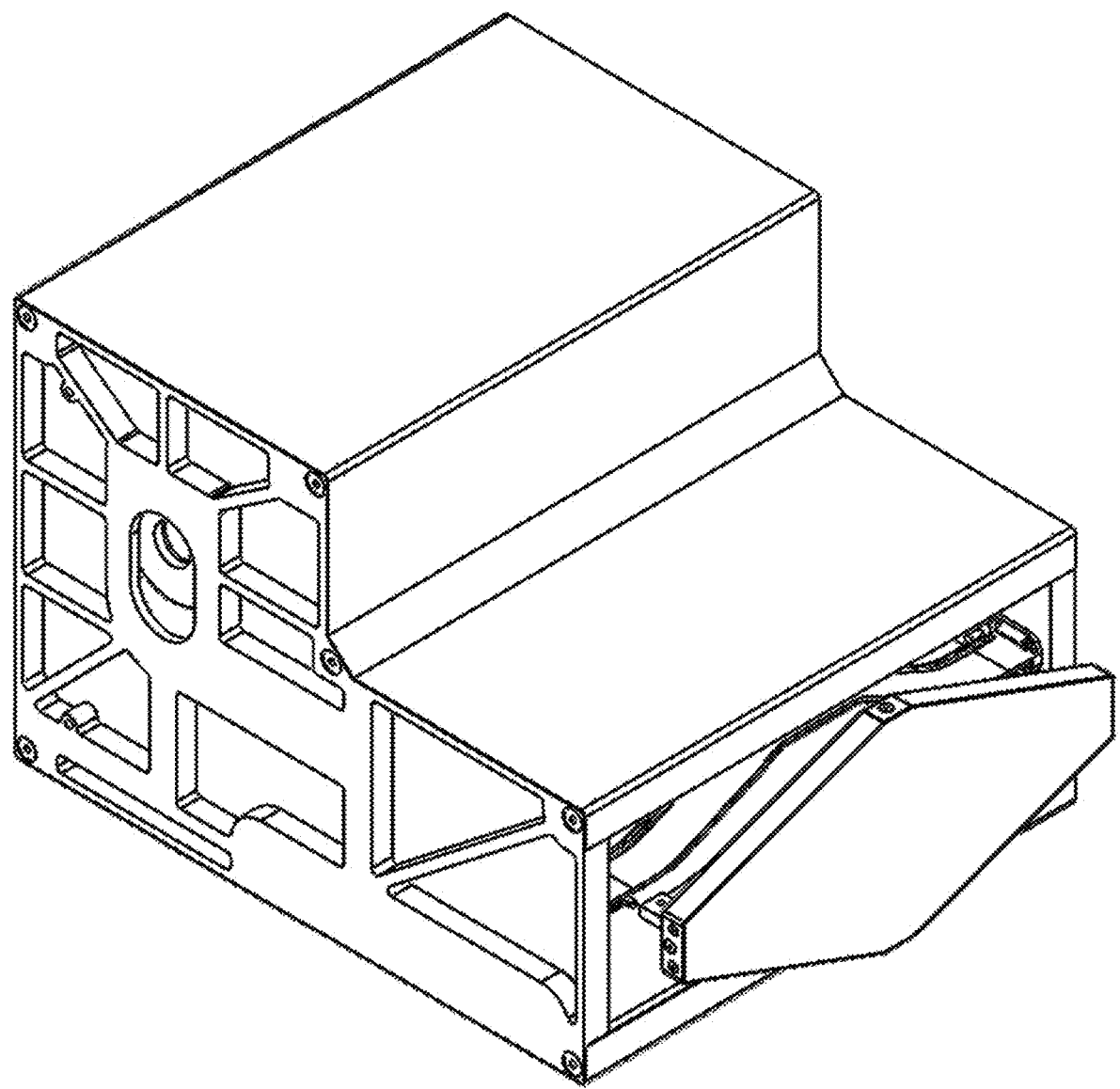
FIG. 12C is an isometric view of the boom deployer of FIG. 12A with a stowed boom.
Figure 12D:
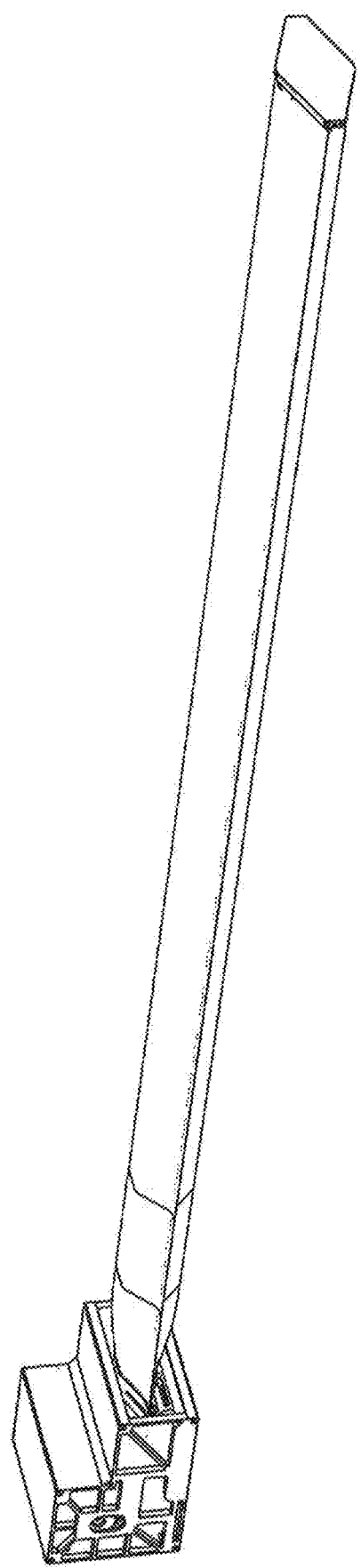
FIG. 12D is an axonometric view of the boom deployer of FIG. 12A with a deployed boom.

FIG. 12A is a side view of a boom deployer according to the Application, showing an exemplary deformable boom expanding on deployment. FIG. 12B is an isometric view of the boom deployer of FIG. 12A. FIG. 12C is an isometric view of the boom deployer of FIG. 12A with a stowed boom. FIG. 12D is an axonometric view of the boom deployer of FIG. 12A with a deployed boom.

Figure 13A:
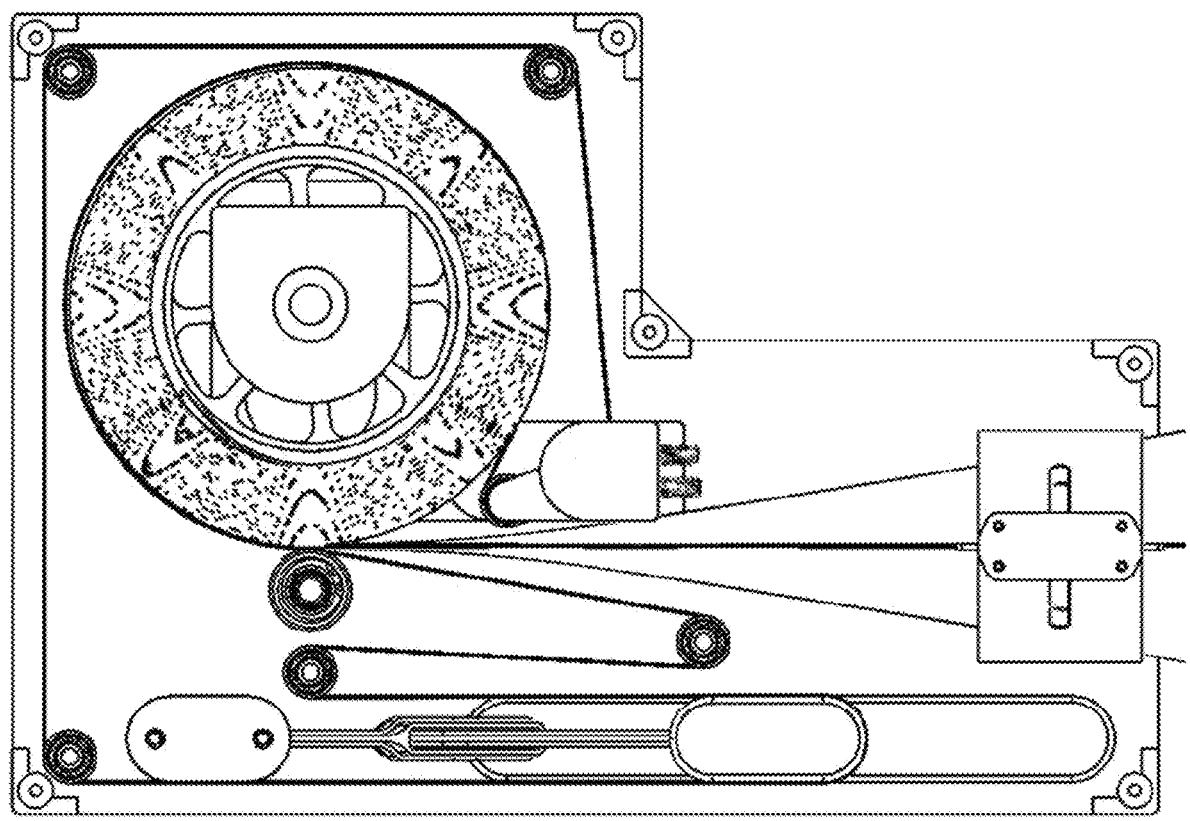
FIG. 13A is a cut away side view of an exemplary boom deployer according to the Application with a rolled deformable boom.
Figure 13B:
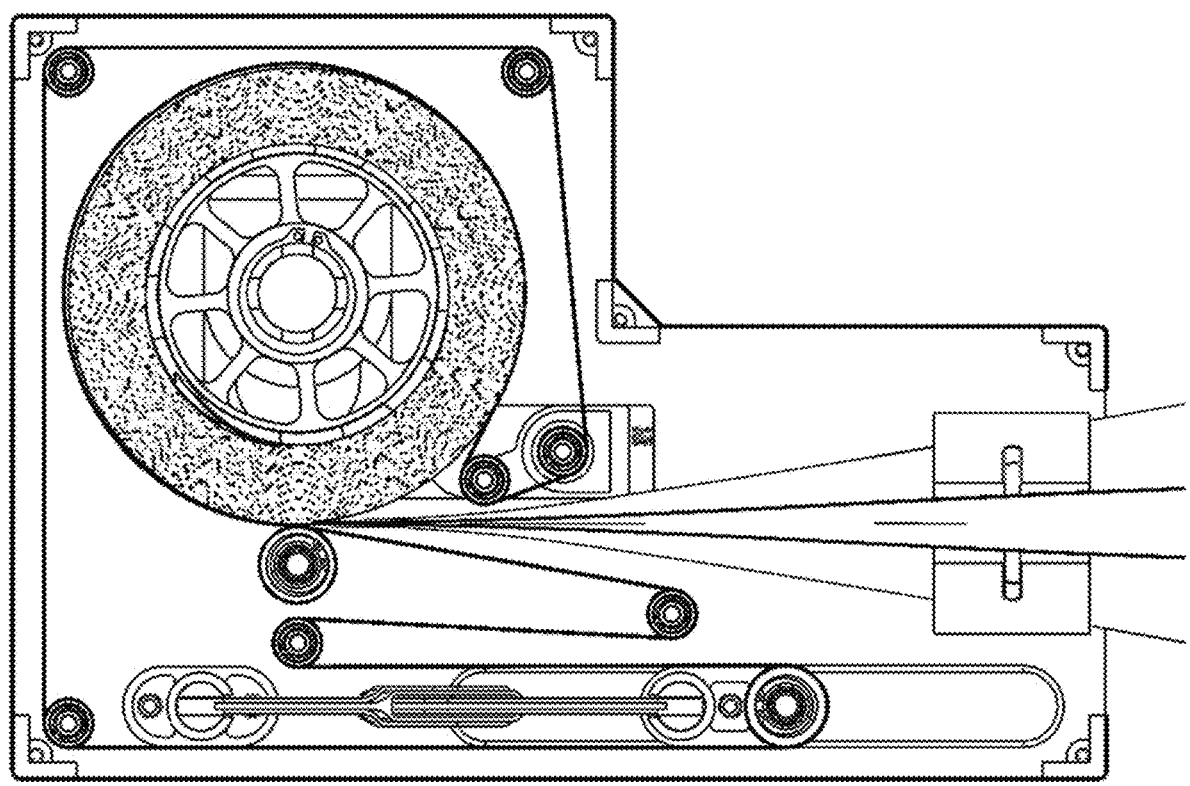
FIG. 13B is another cut away side view of a boom deployer of FIG. 13A showing more detail.
Figure 13C:
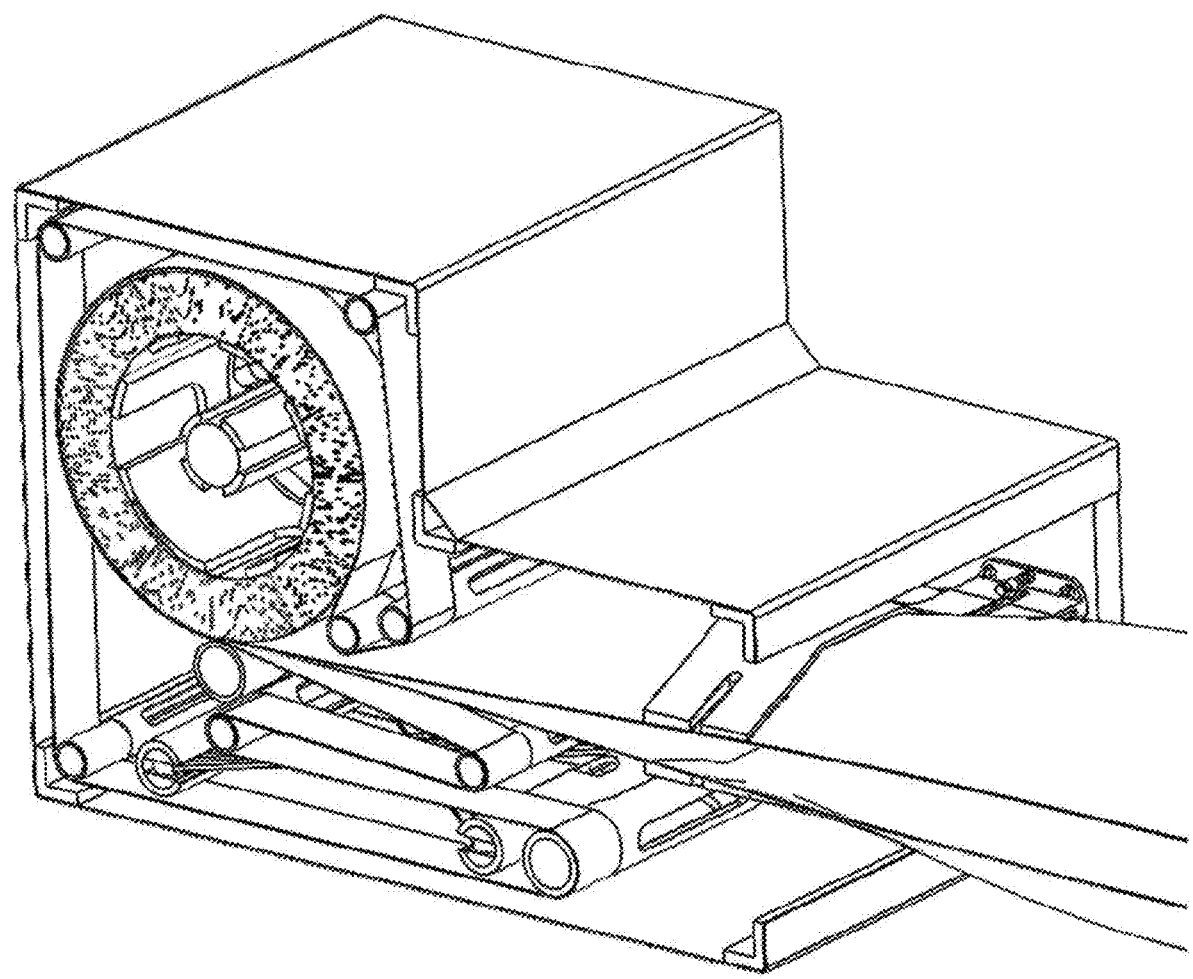
FIG. 13C is cut away isometric view of a boom deployer of FIG. 13A.
Figure 13D:
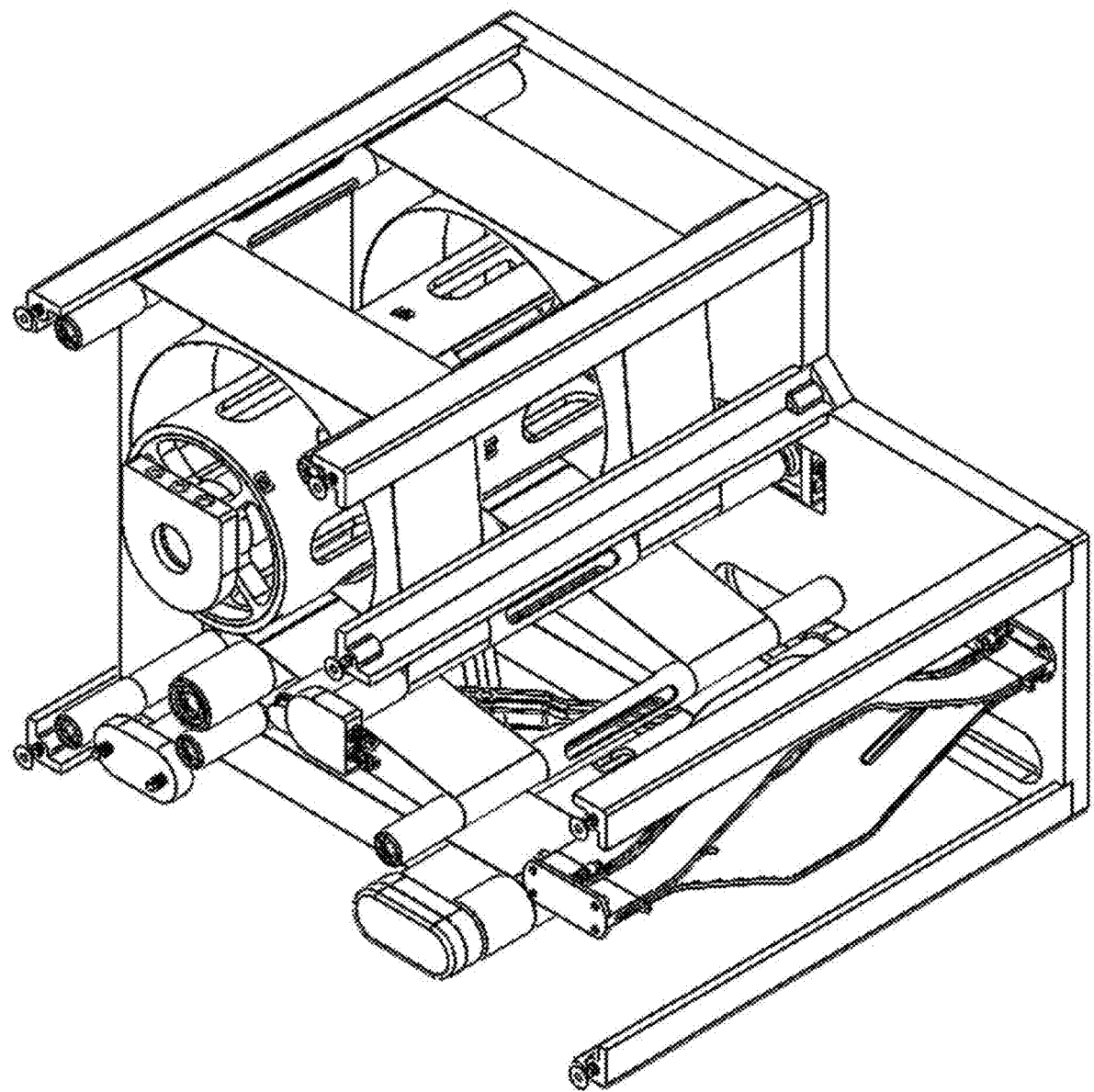
FIG. 13D is cut away isometric view of a boom deployer of FIG. 13A without a rolled boom.
Figure 13E:
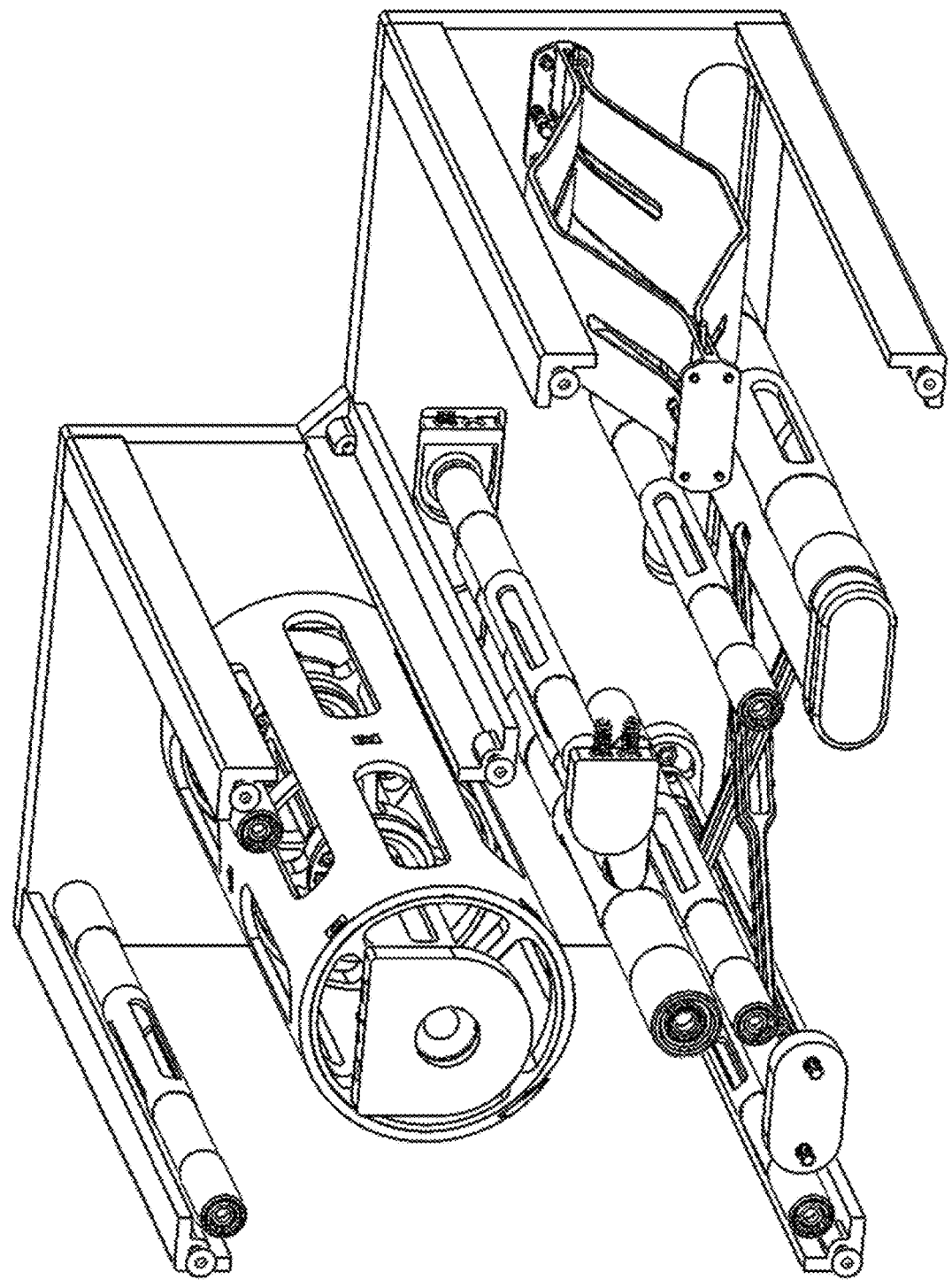
FIG. 13E is cut away partial isometric view of a boom deployer of FIG. 13A without a rolled boom showing more detail of the internal parts.

FIG. 13A is a cut away side view of an exemplary boom deployer according to the Application with a rolled deformable boom. FIG. 13B is another cut away side view of a boom deployer of FIG. 13A showing more detail. FIG. 13C is cut away isometric view of a boom deployer of FIG. 13A. FIG. 13D is cut away isometric view of a boom deployer of FIG. 13A without a rolled boom. FIG. 13E is cut away partial isometric view of a boom deployer of FIG. 13A without a rolled boom showing more detail of the internal parts.

Computer code to design, model, and to control a boom deployer 100 as described hereinabove can be supplied on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A boom deployer to deploy or retract a deformable boom comprising: a boom deployer frame;
   an integrated motor-spool assembly translatably mounted in said boom deployer frame; and
   at least one belt tensioning assembly with one end rigidly fixed and the other translatably mounted in said boom deployer frame, said belt tensioning assembly to tension at least one recirculating belt which rolls over a roller of said belt tensioning assembly, and said at least one recirculating belt configured to roll over a rolled deformable boom, the deformable boom clamped to and rolled on said integrated motor-spool assembly.

2. The boom deployer of claim 1, further comprising an additional translating roller assembly which translates in a direction about perpendicular to said integrated motor-spool assembly.

3. The boom deployer of claim 1, wherein said belt tensioning assembly comprises a scissor linkage.

4. The boom deployer of claim 3, wherein said scissor linkage comprise a plurality of springs and linkage lengths to provide a force-travel profile.

5. The boom deployer of claim 1, comprising two or more recirculating belts.

6. The boom deployer of claim 5, wherein said two or more recirculating belts are disposed on rollers about adjacent to load bearing longerons of the rolled deformable boom.

7. The boom deployer of claim 1, wherein a motor of said integrated motor-spool assembly is rotationally fixed relative to the deployer frame and translates vertically within said boom deployer frame.

8. The boom deployer of claim 1, wherein said integrated motor-spool assembly includes a stationary motor disposed within the frame.

9. The boom deployer of claim 8, wherein said integrated motor-spool assembly rotates on a plurality of bearings about said stationary motor disposed within the frame.

10. The boom deployer of claim 9, wherein said bearings comprise a needle bearing or a ball bearing.

11. The boom deployer of claim 9, wherein said bearings comprise a plain bearing or a sleeve bearing.

12. The boom deployer of claim 9, wherein said bearings comprise a journal bearing.

13. The boom deployer of claim 1, wherein said recirculating belt causes a substantially constant radial compression force on the rolled deformable boom to resist boom blooming.

14. The boom deployer of claim 1, further comprising a boom securement clamp configured to secure a boom to said integrated motor-spool assembly.

15. The boom deployer of claim 1, further comprising a root end guide configured to react to bending along a centerline plane perpendicular to a flange plane.

16. The boom deployer of claim 1, further comprising a root end guide configured to react to bending along a centerline plane parallel to a deployer side-plate.

17. The boom deployer of claim 1, further comprising a distal end interface mechanically coupled to a free end of the boom.

18. The boom deployer of claim 17, wherein said distal end interface comprises at least one slider to react to a loading at load bearing longerons or load bearing elements of the boom to provide a load path from the longerons to a backplate of said distal end interface.

\* \* \* \* \*